US006326563B1

(12) United States Patent
Takeuchi et al.

(10) Patent No.: US 6,326,563 B1
(45) Date of Patent: Dec. 4, 2001

(54) MASS SENSOR AND MASS SENSING METHOD

(75) Inventors: Yukihisa Takeuchi, Nishikamo-gun; Takao Ohnishi, Nishikasugai-gun; Koji Kimura, Nagoya, all of (JP)

(73) Assignee: NGK Insulators, Ltd., Nagoya (JP)

( * ) Notice: Subject to any disclaimer, the term of this patent is extended or adjusted under 35 U.S.C. 154(b) by 0 days.

(21) Appl. No.: 09/401,625

(22) Filed: Sep. 22, 1999

(30) Foreign Application Priority Data

Oct. 9, 1998 (JP) ................................................. 10-288423
Mar. 5, 1999 (JP) ................................................. 11-059504

(51) Int. Cl.$^7$ ................................. G01G 3/14; G01L 1/10
(52) U.S. Cl. ................. 177/210 FP; 73/580; 73/862.59; 331/65; 331/155; 310/311; 310/321
(58) Field of Search ............................. 73/61.79, 862.59, 73/580; 177/210 FP; 331/65, 155; 310/311, 321

(56) References Cited

U.S. PATENT DOCUMENTS

| | | | |
|---|---|---|---|
| 3,614,485 | * 10/1971 | Cosman et al. | 310/321 |
| 3,634,787 | * 1/1972 | Newell | 310/321 |
| 4,050,530 | * 9/1977 | Storace | 177/210 FP |
| 4,144,747 | * 3/1979 | Datwyler, Jr. | 73/862.59 |
| 4,215,570 | * 8/1980 | Eer Nisse | 73/862.59 |
| 4,294,105 | * 10/1981 | Kelly | 177/210 FP |
| 4,372,173 | * 2/1983 | Eer Nise et al. | 73/862.59 |
| 4,546,658 | * 10/1985 | Rocha et al. | 73/862.59 |
| 4,642,508 | * 2/1987 | Suzuki et al. | 310/321 |
| 4,789,804 | 12/1988 | Karube et al. | 310/311 |
| 5,023,503 | * 6/1991 | Legge et al. | 310/311 |
| 5,232,063 | * 8/1993 | Stroller | 177/210 FP |
| 5,362,929 | * 11/1994 | Goto | 177/210 FP |
| 5,684,276 | * 11/1997 | Altemir | 177/210 FP |
| 5,852,229 | * 12/1998 | Josse et al. | 73/61.79 |
| 5,869,763 | * 2/1999 | Vig et al. | 73/580 |
| 5,946,795 | * 9/1999 | Altemir | 177/210 FP |
| 5,962,786 | 10/1999 | Le Traon et al. | 73/514.29 |
| 6,080,939 | * 6/2000 | Hassel | 177/210 FP |

FOREIGN PATENT DOCUMENTS

| | | |
|---|---|---|
| 0 614 087 A2 | 9/1994 | (EP) . |
| 0 764 850 A3 | 3/1997 | (EP) . |
| 0 984 252 A2 | 3/2000 | (EP) . |
| 2 739 190 A1 | 3/1997 | (FR) . |

OTHER PUBLICATIONS

Anzai, Kazuo, *Denki Kagaku*, 53, No. 1 (1985), pp. 63–68.

* cited by examiner

Primary Examiner—Randy W. Gibson
(74) Attorney, Agent, or Firm—Burr & Brown

(57) ABSTRACT

A mass sensor includes a diaphragm, a sensing plate having a piezoelectric element arranged on at least a part of at least one surface joining respective sides, a connecting plate sandwiched by the diaphragm and the sensing plate, wherein the diaphragm, the sensing plate, the piezoelectric element, and the connecting plate form a resonating portion. The connecting plate is bridged across the side surfaces of a concave portion formed in a sensor substrate, and the sensing plate is joined to at least the bottom portion of the concave portion. Change in the mass of the diaphragm is measured by measuring change in the resonant frequencies of the resonating portion accompanying the change in the mass of the diaphragm. The mass sensor enables the easy and accurate measurement of a minute mass of a nanogram order including microorganisms such as bacteria and viruses, or chemical substances, or the thickness of vapor-deposited films.

79 Claims, 9 Drawing Sheets

Fig.1 (a) Fig.1 (b) Fig.1 (c)
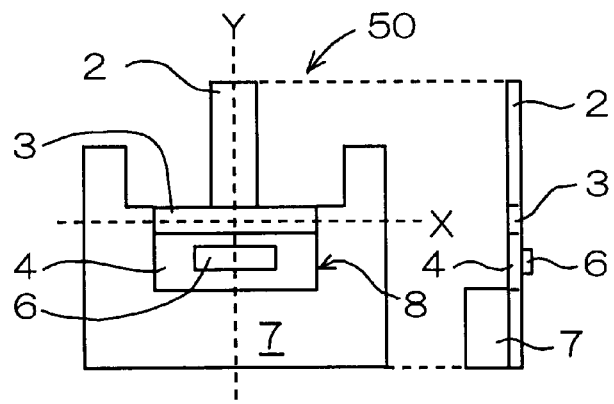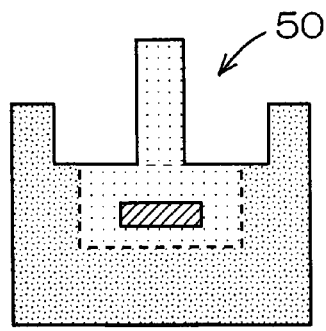
Fig.2
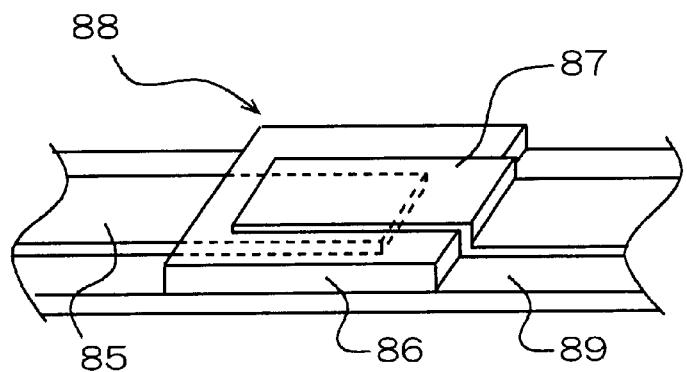
Fig.3
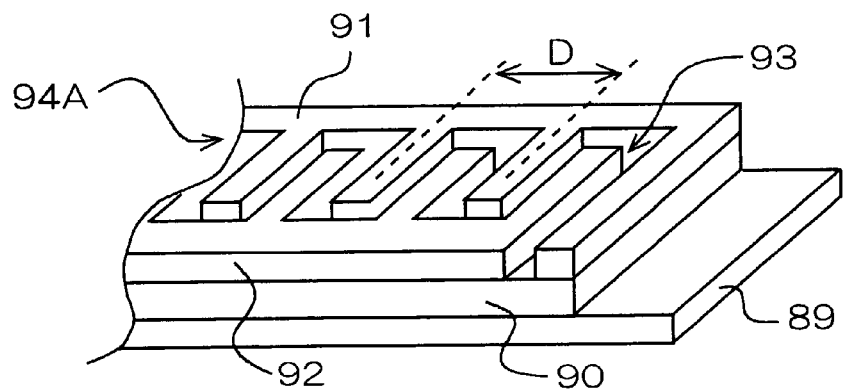

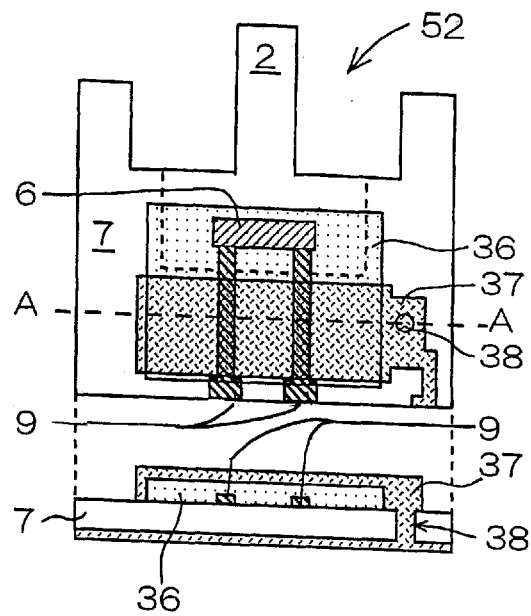
Fig.8 (a)
Fig.8 (b)
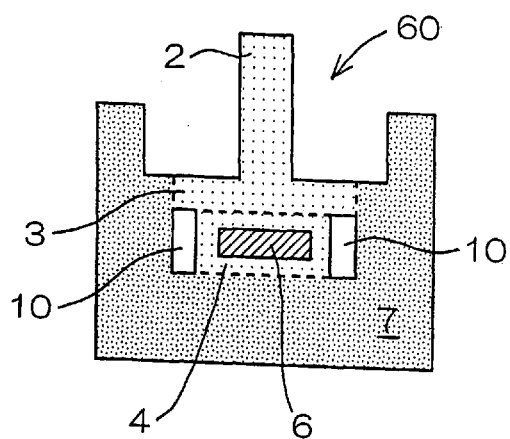
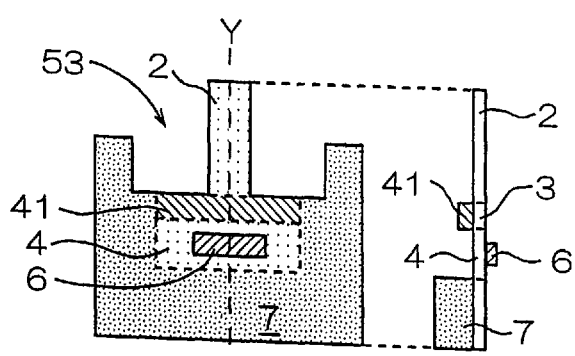
Fig.10 (a)   Fig.10 (b)

MASS SENSOR AND MASS SENSING METHOD

BACKGROUND OF THE INVENTION AND RELATED ART STATEMENT

The present invention relates to a mass sensor for determining a minute mass of a nanogram ($10^{-9}$ g) order, for example, a mass sensor for sensing microorganisms such as bacteria, viruses, and protozoa (immune sensor), and a mass sensor for sensing moisture, toxic substances, or specific chemical substances such as taste components (moisture meter, gas sensor, and taste sensor), and a method for sensing a mass. In particular, the present invention relates to a mass sensor conveniently used for determining the mass of a substance to be sensed by measuring change in resonant frequencies caused by change in the mass of a diaphragm on which a catching substance for catching a substance to be sensed by reacting only with the object of sensing (the substance to be sensed) is applied, and a method for sensing a mass.

Since the mass sensor of the present invention is not limited to the measurement of change in the mass of the catching substance applied on a diaphragm as described above, that is, not limited to the indirect measurement of change in the mass of a diaphragm, but it is naturally possible to sense change in resonant frequency due to change in the mass of the diaphragm itself, the mass sensor can also be used as a thickness gauge for vapor-deposited films or a dew indicator.

Furthermore, even if the mass of the diaphragm is not changed directly or indirectly, the mass sensor of the present invention can also be used as a vacuum gauge, a viscosity meter, or a temperature sensor by placing it in an environment to cause change in resonant frequency, that is, by placing it in a medium environment of gases or liquids having different degree of vacuum, viscosity, or temperature.

Thus, although the mass sensor of the present invention can be used in various applications depending on its embodiments, the same basic principle is also applied to the measurement of change in resonant frequencies of the diaphragm and the resonating portion including the diaphragm.

Recent progress of scientific and medical technologies, and newly developed pharmaceuticals such as antibiotics and chemotherapy drugs have enabled the treatment of various diseases heretofore considered to be difficult to treat. Among what are referred to as diseases, microorganism examinations are essential for the treatment of diseases caused by microorganisms such as bacteria, viruses, or protozoa, to find their pathogens, to clarify their types, and to determine drugs to which they are sensitive.

At present, in the first stage of microorganism examinations, since the cause of a disease and the type of the pathogen can be estimated from the symptoms, various specimens, such as blood, are selected depending on the type of the disease, pathogens present in the specimens are morphologically identified, or antigens or the specific metabolites of pathogens (e.g., toxins or enzymes, etc.) existing in the specimens are immunochemically identified. This process is smeartest, staining, or microscopy used in bacterioscopy, and in recent years, instantaneous identification has become possible by fluorescent antibody staining or enzymatic antibody staining.

Furthermore, the virus serological test, recently used in the detection of viruses, is a method for proving the presence of specific immunity antibodies that appear in the serum of a patient. Examples of the method include the complement fixation reaction in which the presence of antibodies or antigens is determined by adding complements to test blood, and by observing whether the complements react with antigens or antibodies in the blood and fix to the cell membranes of the antigens or antibodies, or destroy the cell membranes.

Except extremely special cases where symptoms have not been seen heretofore, and the disease is caused by a new pathogen which has not been discovered, in the treatment of diseases caused by microorganisms or the like, adequate treatment can be conducted by finding pathogens in an early stage through the microorganism test described above, and the patient can be led to recovery without worsening of the symptoms.

However, with methods such as smeartest, staining, and microscopy, the detection of microorganisms is often difficult depending on their quantities, and time-consuming treatment such as the culture of specimens on an agar is required at need. Also in the virus serological test, since measurements must be performed as a rule during both the acute stage and the convalescent stage for determination from the movement of the quantities of antibodies, there is the problem of time consumption from the point of view of prompt diagnosis.

As seen in complement fixation reaction described above, when a substance to be sensed reacts with a catching substance which catches the substance to be sensed by reacting only with specific substance to be sensed, microorganisms, the mass of the catching substance increases by the mass of the substance to be sensed, even slightly. Such an increase in the mass similarly occurs in the relationship between a catching substance (adsorbing substance) and a chemical substance such as a specific gaseous substance and a smell component, and also applies to the case where a substrate itself without change in the mass is a catching substance, on which a specific substance is deposited or added. On the contrary, when a reaction in which a substance to be sensed caught by a catching substance or the like is released occurs, the mass of the catching substance or the like slightly decreases.

As an example of a method for sensing change in such a small mass, U.S. Pat. No. 4,789,804 discloses, as shown in FIG. 20, a mass sensor 80 comprising a quartz oscillator 81 and electrodes 82, 83 facing the quartz oscillator. When any substance adheres externally to these electrodes 82, 83, the mass sensor 80 senses change in their mass using change in the resonant frequency of the thickness slip oscillation (shear mode oscillation) of the quartz oscillator 81 in the direction of the surface of the electrodes.

Furthermore, FIG. 21 shows a quartz oscillator of a conventional quartz friction vacuum gauge.

However, such a mass sensor 80 has a problem in that since the part to which an external substance adheres and the part for detecting resonant frequency are in the same location, for example, the resonant frequency is unstable when the piezoelectric properties of the mass sensor 80 itself vary due to the temperature of the specimen or change in temperature. Also, if the specimen is a conductive solution, and when the mass sensor 80 is immersed unprotected in the specimen, short-circuit between electrodes may occur. Therefore, the mass sensor 80 must be subjected to insulation such as resin coating.

In order to the solve problems in such a mass sensor 80, the present inventors have disclosed in Japanese Patent Application No. 9-361368 various mass sensors for measuring change in resonant frequencies before and after the mass has been changed when a diaphragm is allowed to oscillate by directly or indirectly changing the mass of the diaphragm. An example is shown in FIG. 19. A mass sensor 30 has a construction in which a resonating portion, composed by joining a connecting plate 33 to a diaphragm 31, and joining a sensing plate 32 having a piezoelectric element 35 arranged on the surface to the connecting plate 33, is joined to the side of a sensor substrate 34 having rectangular sides. In this mass sensor 30, change in the mass thereof can be known easily in a short time by measuring change in the resonant frequencies of the resonating portion mainly due to change in the mass of the diaphragm 31.

However, such a mass sensor 30 has a problem of difference in sensitivity depending on whether the location where the mass of the diaphragm 31 changed is, for example, the central portion or the end portion of the diaphragm 31, even the same amount of change, and improvement for minimizing the difference in sensitivity is demanded. Also, the sensitivity can be improved by making the diaphragm 31 oscillate more easily.

SUMMARY OF THE INVENTION

The present invention aims to solve the above problems of micro-mass sensors, and according to the present invention, there are provided first to third mass sensors structurally classified described below.

According to the present invention, as a first mass sensor, there is provided a mass sensor comprising:

a diaphragm, a sensing plate having a piezoelectric element arranged on at least a part of at least one surface joining respective sides each other, a connecting plate sandwiched by the diaphragm and the sensing plate, wherein the diaphragm, the sensing plate, the piezoelectric element and the connecting plate form a resonating portion, wherein said connecting plate is bridged across the side surfaces of a concave portion formed in a sensor substrate, and said sensing plate is joined to at least the bottom portion of said concave portion.

In this first mass sensor, it is also preferable to provide a slit portion on the connecting plate. Also, it is preferable to join at least one spring plate or at least one spring plate having a cavity portion to at least one surface of the connecting plate, and in this case, it is preferable to provide a slit portion to the area where the spring plate of the connecting plate is not joined, or at least a part of the area facing to the cavity portion. In this case, the connecting plate has a thick portion where the spring plate is joined and an opening or an aperture portion.

A concave portion means a portion consisting of side surfaces facing to each other and a bottom surface connecting these side surfaces. In the present invention, the bottom surface is not necessarily a plane, but may be changed to various shapes, such as providing a cavity or providing a protrusion, unless the measurement of the oscillation or resonant frequencies of the diaphragm is affected. The term "piezoelectric" used herein includes the meaning of "electrostriction" as well.

According to the present invention, as a second mass sensor, there is provided a mass sensor comprising:

a first connecting plate, a second connecting plate, a sensing plate having a piezoelectric element arranged on at least a part of at least one surface, said sensing plate being sandwiched by the first connecting plate and the second connecting plate, a first diaphragm sandwiching said first connecting plate with said sensing plate, a second diaphragm sandwiching said second connecting plate with said sensing plate, wherein the first connecting plate, the second connecting plate, the sensing plate, the piezoelectric element, the first diaphragm and the second diaphragm form a resonating portion by joining respective sides in one direction, wherein said first and second connecting plates are bridged across the sides facing to each other provided on a sensor substrate.

Furthermore, according to the present invention, as a third mass sensor, there is provided a mass sensor comprising:

a first sensing plate having a piezoelectric element arranged on at least a part of at least one surface, a second sensing plate having a piezoelectric element arranged on at least a part of at least one surface, an interference preventing plate sandwiched by said first sensing plate and said second sensing plate, a first diaphragm, a second diaphragm, a first connecting plate sandwiched by the first sensing plate and the first diaphragm, a second connecting plate sandwiched by the second sensing plate and the second diaphragm, wherein the first sensing plate, the second sensing plate, the piezoelectric element, the interference preventing plate, the first diaphragm, the second diaphragm, the first connecting plate and the second connecting plate form a resonating portion by joining respective sides in one direction, wherein said first and second connecting plates and said interference preventing plate are bridged across the sides facing to each other provided on a sensor substrate.

Here, in this third mass sensor, it is preferable to join a spring plate to the interference preventing plate.

In these second and third mass sensors, it is also preferable to provide slit portions on the first connecting plate and/or the second connecting plate. Also, it is preferable to join at least one spring plate or at least one spring plate having a cavity portion to at least one surface of the first connecting plate and/or the second connecting plate, and in this case, it is preferable to provide a slit portion on the area where the spring plate of the first connecting plate and/or the second connecting plate is not joined, or at least a part of the area facing to the cavity portion. Each of the connecting plates has a thick portion where the spring plate is joined and an opening or an aperture portion. Furthermore, it is preferable to differentiate the shapes of the first diaphragm and the second diaphragm.

In all of the first to third mass sensors of the present invention, it is preferable to form a diaphragm, a connecting plate, a sensing plate, and a sensor substrate integrally, and when a spring plate is joined to the connecting plate, it is preferable to form this spring plate also integrally. In order to obtain such an integral structure, a method is used in which a connecting plate, a diaphragm, and a sensing plate are integrally formed from a vibrating plate, a sensor substrate is integrally formed by laminating the vibrating plate and a base plate, and when a spring plate is joined to the connecting plate, the spring plate is formed from an intermediate plate, and the intermediate plate is integrally formed by inserting it between the vibrating plate and the base plate.

Also, in the mass sensor of the present invention, it is preferable to form one or more concave portion or through-hole on the sensor substrate, and to form a resonating portion on each of the inner circumferential surfaces of the concave portion or through-holes. Although the shape of the through-holes is optional, it is preferable from the structure of the resonating portion to have sides facing to each other in parallel. Also, although the basic definition of the concave portion is as described above, here, since a part of a square through-hole can be deemed as a concave portion, the concave portion may in turn be the one using a part of the through-hole.

Now, all the mass sensors of the present invention can be used suitably for the measurement of change in a minute mass. As an aspect of the use, there is a method in which a catching substance reacting with and catching only a substance to be sensed is applied on a diaphragm, the resonant frequencies of the resonating portion in the state where the substance to be sensed has not been caught by the catching substance and in the state after the substance to be sensed has been caught by the catching substance are measured by a piezoelectric element, and the mass of the substance to be sensed having been caught is measured from change in the measured resonant frequencies. In the method for using such a mass sensor, when the mass sensor has a plurality of diaphragms, the catching substance is not applied to at least one diaphragm, which can be used for referencing or the like. Also, by applying different types of catching substances to each of a plurality of diaphragms, different types of substances to be sensed can be sensed simultaneously.

In the mass sensor of the present invention, without using the above-described aspect, it is preferable to form a plurality of diaphragms for increasing the dynamic range by integrating signals derived from change in the states of the diaphragms. Here, "when a plurality of diaphragms are formed" is when two or more resonating portions each having a diaphragm are formed on a sensor substrate, or when one or more resonating portion each having a plurality of diaphragms is formed. Also, it is preferable to divide a piezoelectric element arranged on a resonating portion into two or three portions, or to arrange a plurality of piezoelectric elements on a resonating portion. In this case, it is preferable for improving sensitivity to use at least one of divided piezoelectric elements and/or a plurality of piezoelectric elements for driving and at least one of other piezoelectric elements for sensing. Furthermore, it is also preferable to arrange a plurality of resonating portions on one mass sensor. Sensitivity may also be improved by forming piezoelectric elements having directions of polarization opposite to each other on respective surfaces of the sensing plate.

Although the mass sensor of the present invention can be used in any environments, when it is immersed in a conductive solution on using, it is preferable to provide a position sensor consisting of a pair of electrodes on the middle position between the diaphragm and the piezoelectric element on the sensor substrate, so that the diaphragm is immersed in the conductive solution but the piezoelectric element is not, so as to cause change in the mass mainly of the diaphragm, and to prevent the short-circuiting of the piezoelectric element. In addition, if the piezoelectric element and electrode leads connected to the electrodes of the piezoelectric element are coated with a resin or glass insulation coating layer, it is convenient to use the mass sensor in a humid environment or in a liquid. As a resin preferably used in this case, fluorocarbon resin or silicone resin is used. Furthermore, it is preferable that a shield layer consisting of a conductive material is formed on at least a part of the surface of the insulation coating layer, so as to reduce external electromagnetic noise and to improve measurement sensitivity.

In the mass sensor of the present invention, the sensor substrate, the diaphragm, the connecting plates, the sensing plate, and when a spring plate is provided, the spring plate are preferably fabricated using fully stabilized zirconia or partially stabilized zirconia. As the piezoelectric film of the piezoelectric element, a material whose major component consists mainly of lead zirconate, lead titanate, and lead magnesium niobate is preferably used. The dimensional adjustment of at least any of the diaphragm, the connecting plates, and the sensing plate is preferably performed by trimming using laser processing or machining. Trimming using laser processing or machining is also preferably used for the dimensional adjustment of the electrodes of the piezoelectric element, thereby the available electrode area of the piezoelectric element can easily be adjusted.

According to the present invention, there is also provided a method for sensing the mass comprising:

providing a mass sensor comprising a diaphragm, a sensing plate having a piezoelectric element arranged on at least a part of at least one surface joining respective sides each other, a connecting plate sandwiched by the diaphragm and the sensing plate, wherein the diaphragm, the sensing plate, the piezoelectric element and the connecting plate form a resonating portion, and measuring resonant frequencies by said piezoelectric element, on the basis of an oscillation mode in which said diaphragm performs reciprocal oscillation in parallel to the direction sandwiching said connecting plate by said sensing plate and said diaphragm.

BRIEF DESCRIPTION OF THE DRAWINGS

FIGS. 1(*a*)(*b*)(*c*) are diagrams showing an embodiment of a mass sensor of the present invention; (a) is a plan; (b) is a sectional view; (c) is a plan.

FIG. 2 is a perspective view showing an embodiment of a piezoelectric element installed in a mass sensor of the present invention.

FIG. 3 is a perspective view showing an embodiment of another piezoelectric element installed in a mass sensor of the present invention.

FIGS. 8(*a*)(*b*) are diagrams showing still another embodiment of a mass sensor of the present invention; (a) is a plan; (b) is a sectional view.

FIG. 9 is a plan showing still another embodiment of a mass sensor of the present invention.

FIGS. 10(a)(b) are diagrams showing still another embodiment of a mass sensor of the present invention; (a) is a plan; (b) is a sectional view.

DETAILED DESCRIPTION OF PREFERRED EMBODIMENT

Figure 4:
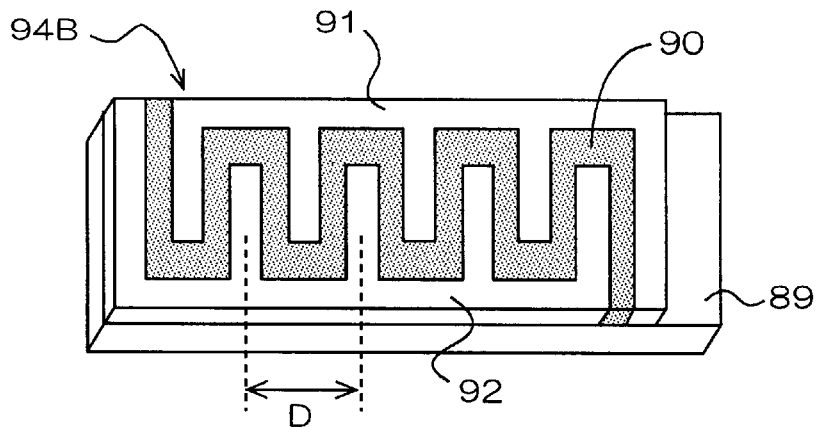
FIG. 4 is a perspective view showing an embodiment of still another piezoelectric element installed in a mass sensor of the present invention.

Since the mass sensor of the present invention has a structure in which difference in sensitivity depending on the location of change in the mass of the diaphragm is small and the diaphragm easily oscillates at larger amplitudes, change in the minute mass can be known surely in a short time with a great accuracy from the specific value of change in the resonant frequencies of the resonating portion. Therefore, the mass sensor can be used favorably for sensing, for example, microorganisms or chemical substances in a specimen.

The embodiments of the present invention will be described below referring to drawings, focussing on a mass sensor comprising a catching substance reacting with and catching only a specific substance to be sensed, applied to a diaphragm, and a method for using such a mass sensor.

However, as described above, and as will be described below, the mass sensor of the present invention has many applications as well as the measurement of change in the mass. Therefore, the present invention is not limited to the following description.

FIG. 1(a) is a plan showing an embodiment of a mass sensor of the present invention, and FIG. 1(b) is a sectional view of the mass sensor viewed from the X-axis direction of the Y axis in FIG. 1(a), that is a sectional view in the thickness direction on the Y axis. Hereafter, such a sectional view will be referred to as "a sectional view in the Y axis." In the mass sensor 50, a connecting plate 3 is sandwiched between a diaphragm 2 and a sensing plate 4 so as to join at respective sides, and a piezoelectric element 6 is arranged on a surface of the sensing plate 4. The mass sensor 50 has the structure in which these diaphragm 2, connecting plate 3, sensing plate 4, and piezoelectric element 6 constitute a resonating portion; the connecting plate 3 is bridged across the side surfaces of a concave portion 8 provided in the sensor substrate 7; and the sensing plate 4 is fitted in the bottom of the concave portion 8. In the mass sensor 50, the piezoelectric element 6 is provided with an electrode lead so as to conduct electricity to the electrode; however, this electrode lead is not shown in FIG. 1(a), as well as in FIG. 1(c) described later.

Here, a diaphragm mainly means the place to cause or to be subject to change in mass, and is an element that oscillates in various modes as described later; a connecting plate means an element to connect the diaphragm, sensor substrate, and sensing plate; and a sensing plate means an element that is deformed by the movement of the diaphragm, and transmits the strain to the sensing element, such as a piezoelectric element, installed on the surface, or on the contrary, transmits strain or oscillation generated by a driving element, such as a piezoelectric element, to the diaphragm. The sensor substrate means an element to support the resonating portion, carry various electrode terminals for connecting to measuring instruments, and is used for handling in actual uses.

In the mass sensor 50, although the diaphragm 2, the connecting plate 3, and the sensing plate 4 are not necessarily required to have the same thickness, it is preferable that the diaphragm 2, the connecting plate 3, and the sensing plate 4 are integrally formed from a plate (hereafter referred to as "vibrating plate"). This is advantageous because the diaphragm 2, the connecting plate 3, and the sensing plate 4 have the same thickness so as to form the even surface, and also because manufacturing is easy. Therefore, although boundaries are shown by solid lines at joining portions between the diaphragm 2, the connecting plate 3, and the sensing plate 4 in FIG. 1(a), practically and preferably, the diaphragm 2, the connecting plate 3, and the sensing plate 4 are of an integral structure without structural boundaries, as shown in FIG. 1(c).

It is preferable that the connecting plate 3 and the sensing plate 4 are also directly and integrally formed with a sensor substrate 7. In order to realize such a structure, it is preferable to form the sensor substrate 7 integrally with the vibrating plate and the base plate by laminating as described in detail in the fabrication of the mass sensor of the present invention described below. Here, it is preferable to form the base plate thicker than the vibrating plate for maintaining the mechanical strength of the mass sensor 50 itself. The base plate means a plate used for forming the main part of the sensor substrate 7.

The thickness of the diaphragm 2, as well as the connecting plate 3 and the sensing plate 4, is preferably 3 to 20 $\mu$m, and more preferably, 7 to 15 $\mu$m. The thickness of the base plate at this time is adequately determined considering the ease of operating. It is preferable for improving sensitivity that the mass ratio of the diaphragm 2 to the connecting plate 3 (mass of the diaphragm 2/mass of the connecting plate 3) is 0.1 or more, and is determined to be an adequate ratio in this range considering the thickness and area of the diaphragm 2. When a spring plate is provided on the connecting plate, as described below, this mass ratio can be examined by dividing the mass of the diaphragm with the total mass of the connecting plate and the spring plate.

Such diaphragm 2, connecting plate 3, sensing plate 4, and the sensor substrate 7 are preferably formed from a ceramic material. Such ceramic materials include, for example, fully stabilized zirconia, partially stabilized zirconia, alumina, magnesia, and silicon nitride. Among these, fully-stabilized/partially-stabilized zirconia is most preferably adopted because of its high mechanical strength even in a small thickness, high toughness, and low reactivity with the piezoelectric film and electrode materials.

When stabilized/partially-stabilized zirconia is used as a material for the sensor substrate 7 and the like, it is preferable to prepare a vibrating plate having a sensing plate 4 containing at least an additive such as alumina or titania. The vibrating plate and the base plate forming the sensor substrate 7 are not necessarily required to be formed from the same material, but the combination of above-described various ceramic materials may be used depending on the design. However, it is preferable to construct integrally using the same type of materials from the point of view of securing the reliability of joints and the simplification of the manufacturing process. These materials are used in common to all the mass sensors of the present invention, and can be used for members such as the spring plate and the interference preventing plate described below.

The aspects of the piezoelectric element 6 include the piezoelectric element 88 having a first electrode 85, a piezoelectric film 86, and a second electrode 87 laminated on the sensing plate 89 as FIG. 2 shows, or a piezoelectric element 94A having a comb structure in which a piezoelectric film 90 is placed on a sensing plate 89 and a first electrode 91 and a second electrode 92 form gaps 93 of a constant width on the top of the piezoelectric film 90 as FIG. 3 shows. The first electrode 91 and the second electrode 92 in FIG. 3 may be formed in the surface between the sensing plate 89 and the piezoelectric film 90. Furthermore, as shown in FIG. 4, a piezoelectric element 94B in which a piezoelectric film 90 is embedded between the comb-shaped first and second electrodes 91, 92 is also suitably used. Here, when comb-shaped electrodes as shown in FIGS. 3 and 4 are used, the measuring sensitivity can be raised by reducing the pitch D.

Although a piezoelectric film consisting of piezoelectric ceramics is suitably used in the piezoelectric element 6, electrostrictive ceramics or ferroelectric ceramics may also be used. These materials may be those requiring or not requiring polarization treatment.

Ceramics that can be used in the piezoelectric film include, for example, lead zirconate, lead titanate, lead magnesium niobate, lead magnesium tantalate, lead nickel niobate, lead zinc niobate, lead manganese niobate, lead antimony stannate, lead manganese tungstate, lead cobalt niobate, and barium titanate, or composite ceramics containing a combination of any of the above ceramics. In the present invention, a material containing the components consisting mainly of lead zirconate, lead titanate, and lead magnesium niobate as the main component is preferably used, because such a material not only has high electromechanical coupling factor and piezoelectric constant, but also has small reactivity with the sensor substrate material on sintering piezoelectric film, and can form the desired composition stably.

Furthermore, ceramics containing the oxides of lanthanum, calcium, strontium, molybdenum, tungsten, barium, niobium, zinc, nickel, manganese, cerium, cadmium, chromium, cobalt, antimony, iron, yttrium, tantalum, lithium, bismuth, and tin alone, or in the combination of some of these oxides, or ceramics in which other compounds of these elements are added may be used for the above piezoelectric ceramics. For example, a ceramic material containing lead zirconate, lead titanate, and lead magnesium niobate as main components, to which lanthanum or strontium is added is also preferable.

On the other hand, the first electrode and the second electrode in the piezoelectric element 6 are preferably formed from a metal that is solid at room temperature and conductive. For example, a metal such as aluminum, titanium, chromium, iron, cobalt, nickel, copper, zinc, niobium, molybdenum, ruthenium, palladium, rhodium, silver, tin, tantalum, tungsten, iridium, platinum, gold, or lead alone, or an alloy of some of these elements can be used. Furthermore, a cermet material in which the same material used in the piezoelectric film or the sensing plate is dispersed in these materials may be used.

The selection of the material for the actual first electrode and the second electrode is determined depending on the method for forming the piezoelectric film. For example, when the above-described piezoelectric element 88 is formed, the first electrode 85 is formed on the sensing plates 4A, 4B, then the piezoelectric film 86 is formed on the first electrode 85 by firing, the first electrode 85 must be made of a high melting point metal, such as platinum, which is not affected by the temperature for firing the piezoelectric film 86. Whereas, since the second electrode 87 formed on the piezoelectric film 86 after forming the piezoelectric film 86 can be formed at a low temperature, a low melting point metal, such as aluminum, can be used.

Although the piezoelectric element 88 can be formed integrally by co-firing, in this case, both the first electrode 85 and the second electrode 87 must be made of a high melting point metal which resists the temperature for firing the piezoelectric film 86. On the other hand, when the first and second electrodes 91, 92 are formed on the piezoelectric film 90, as shown in FIG. 3, both electrodes can be made of the same low melting point metal. Thus, the materials for the first electrode and the second electrode can be selected suitably depending on the firing temperature of the piezoelectric film, and the structure of the piezoelectric element.

Since a problem arises when the area of the piezoelectric film is expanded, in that although sensitivity increases because of increase in the output charge, the size of the sensor increases, the area of the piezoelectric film should be designed to an adequate size. Also, since a problem arises when the thickness of the piezoelectric film is decreased, in that although sensitivity increases, the rigidity of the piezoelectric film is lowered, the total thickness of the sensing plates 4A, 4B and the piezoelectric film is preferably 15 to 50 $\mu$m. The structure of the piezoelectric element and the materials used are common to all the mass sensor of the present invention.

Figure 5:
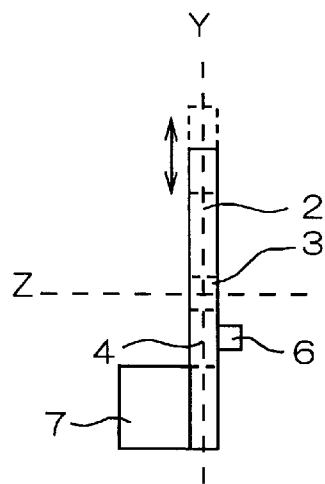
FIGS. 5(*a*)(*b*)(*c*)(*d*) are diagrams illustrating an oscillation mode of a diaphragm suitably used in a mass sensor of the present invention.
Figure 5:
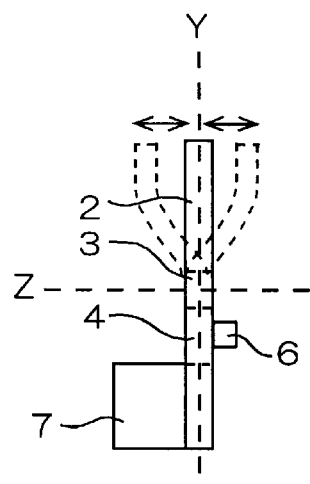
Figure 5:
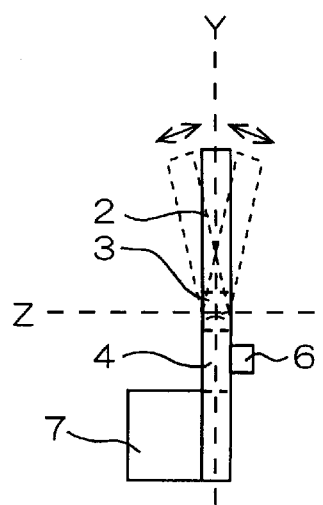
Figure 5:
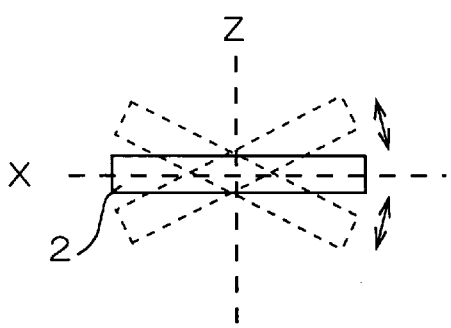

In the mass sensor 50, the oscillation modes of the diaphragm 2 preferably used for measurement of resonant frequencies include an oscillation mode in which the diaphragm 2 oscillates reciprocally in parallel to the Y-axis direction which is the direction of the sensing plate 4 and the diaphragm 2 sandwiching the connecting plate 3 (hereafter, such an oscillation mode is referred to as "uniaxial oscillation mode"). The movement of the diaphragm 2 in the uniaxial oscillation mode viewed from the X-axis direction of FIG. 1(a) is the movement in which the diaphragm 2 is on the location indicated by the solid line in the static state, and makes a reciprocal movement between the locations indicated by dotted lines in the oscillating state as shown in FIG. 5(a). It is preferable to measure the resonant frequency on the basis of this uniaxial oscillation mode with the piezoelectric element 6, because the difference in sensitivity in the diaphragm 2 depending on the location of change in the mass can be minimized. Also, since the uniaxial oscillation mode is a rigid-body mode utilizing the side of the diaphragm 2, and since the diaphragm 2 is thin, it is little affected by external environment such as density and viscosity. Therefore, it resists change in temperature, has the highest sensitivity, and excels in resistance to environment. Due to such characteristics, the mass sensor 50 can be used even if the diaphragm 2 or the entire mass sensor 50 is immersed in a liquid.

Other oscillation modes used in the mass sensor 50 include the flexural or bending mode in which the diaphragm 2 viewed from the X-axis direction bends in the Z-axis direction perpendicular to both the X axis (the direction vertical to the paper) and the Y axis as shown in FIG. 5(b); the X-axis rotation mode in which the diaphragm 2 viewed from the X-axis direction rotates around the X axis passing through the center of the connecting plate 3 as shown in FIG. 5(c); and the Y-axis rotation mode in which the diaphragm 2 viewed from the Y-axis direction rotates around the Y axis as shown in FIG. 5(d). Although these oscillation modes are not preferred for measurement in a liquid, because the resistance which the surface of the diaphragm 2 receives from the environment during oscillation is large, the mass sensor oscillating in these oscillation modes can be sufficiently used for measurement in a gas.

In FIGS. 5(b) to 5(d), the solid line indicates the location of the diaphragm 2 in the static state, and dotted lines indicate locations of oscillation other than the static state. Since these various dislocation modes mean that the direction of the dislocation of the diaphragm 2 is dominant in the above-described directions, but the directional components other than the above-described directions are not completely eliminated. This is the same for referring to dislocation modes when various embodiments of the present invention will be described below.

In the mass sensor 50, when an AC voltage is applied to the piezoelectric film of the piezoelectric element 6, expending and contracting oscillation occurs in the piezoelectric film due to $d_{31}$ or $d_{33}$, and bending movement occurs in the sensing plate 4. This movement is transmitted to the diaphragm 2, the diaphragm 2 oscillates at the same frequency as the frequency of the AC voltage applied to the piezoelectric film by the diaphragm 2, and when the frequency of the AC voltage is a certain frequency, the resonance phenomenon of the above-described uniaxial oscillation mode or the like occurs. By measuring change in the resonant frequency by the piezoelectric element 6 itself, the presence of change in the mass of the diaphragm 2 can be checked.

On the other hand, when the diaphragm 2 is oscillated by the external excitation force and the like, bending/distortion oscillation occurs in the sensing plate 4, thereby expanding and contracting oscillation occurs in the plate-like piezoelectric film 86 when the piezoelectric element 6 has a structure like the piezoelectric element 88, and a voltage is generated on the basis of the electromechanical coupling factor $k_{31}$ (piezoelectric constant $d_{31}$) of the piezoelectric film 86. When the piezoelectric element 6 is the piezoelectric element 94A or 94B having a comb-shaped electrode structure, a constant voltage is generated on the basis of $K_{33}$ ($d_{33}$). By sensing the P—P value of such a voltage value and sensing the resonant frequency in the uniaxial oscillation mode or the like by detecting the frequency corresponding to the maximum P—P value, change in the mass can be known.

In the present invention, although it is preferable that the piezoelectric element is constituted by the element utilizing the transverse effect of the electric field induced strain represented by the above-described $d_{31}$ or $k_{31}$, or the longitudinal effect of the electric field induced strain represented by $d_{33}$ or $k_{33}$, it can also be constituted by the element utilizing the slipping effect of the electric field induced strain represented by $d_{15}$ or $k_{15}$ (shear mode) or the like.

Incidentally, for sensing under the aforementioned respective modes, not only sensing involving the resonant frequency of first order but also sensing involving the resonant frequency of higher order such as second order and third order is preferable. For example, in the first order resonant frequency, when the resonant frequency under oscillation mode other than reciprocal oscillation mode close to that under reciprocal oscillation mode at the stage of designing, sensing under the mode with other higher order resonant frequency which will not be close to it can pursue improvement of the determination accuracy.

In the mass sensor 50, although the piezoelectric element 6 is placed only on one surface of the sensing plate 4, the piezoelectric element 6 may be formed on each of the both surfaces of the sensing plate 4. In this case, it is preferable to use one of the piezoelectric elements for driving (exciting) the diaphragm 2 and the other for sensing (receiving) to improve measuring sensitivity. It is also preferable for the improvement of measuring sensitivity to make the direction of polarization of the piezoelectric film of the piezoelectric element opposite to each other. Both the piezoelectric elements may be used for driving the diaphragm 2 and each piezoelectric element may be used for sensing resonant frequencies. By thus performing the comparing operation of signals sensed by each piezoelectric element, the dynamic range can be expanded while decreasing noise, eliminating the influence of other oscillation modes, and improving sensing accuracy.

Figure 6:
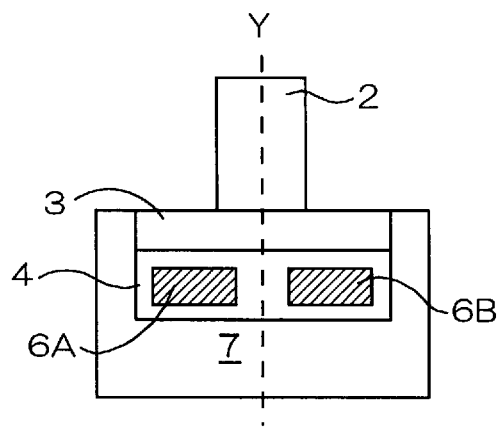
FIGS. 6(*a*)(*b*) are plans showing examples of aspects of dividing a piezoelectric element in a mass sensor of the present invention.
Figure 6:
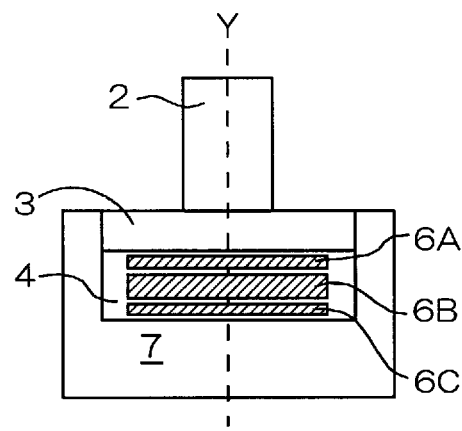

Even when a piezoelectric element 6 is placed on one surface of the sensing plate 4, it is preferable for reducing difference in the measuring sensitivity in the diaphragm 2 to place the piezoelectric element 6 divided into two piezoelectric elements (piezoelectric elements 6A and 6B) at the Y axis in the X-axis direction as the plan of FIG. 6(a) shows, and the piezoelectric elements 6A, 6B are simultaneously driven to drive the diaphragm 2 without distorting the central portion of the connecting plate 3. Furthermore, it is preferable for stabilizing waveforms during resonance and improving sensing accuracy that the piezoelectric element 6 is divided into three piezoelectric elements (piezoelectric elements 6A, 6B, and 6C) in the Y-axis direction as the plan of FIG. 6(b) shows, and the central piezoelectric element 6B is used for driving and the outer piezoelectric elements 6A and 6C for sensing, because the piezoelectric elements 6A and 6C for sensing are placed in the vicinity of the joining portion of the connecting plate 3 and the sensing plate 4, and the joining portion of the sensor substrate 7 and the sensing plate 4 where stress is concentrated.

Such a divided piezoelectric element 6 can be formed by the method in which a piezoelectric element 6 is divided by laser processing or the like after placing the piezoelectric element 6, or the method in which the previously divided piezoelectric element 6 is placed. When the piezoelectric element 6 is divided into three portions, the piezoelectric element having a laminated structure as shown in FIG. 2 is preferably used, and in this case, the piezoelectric element 6 is easily fabricated if only the upper electrode (second electrode 87) formed above the common lower electrode (first electrode 85) is divided by laser patterning or the like. The above-described various aspects of the placement of the piezoelectric element are also suitably used in other mass sensors of the present invention described below.

When the number of piezoelectric elements thus placed is increased, the effect such as the improvement of measuring sensitivity can be achieved, but on the contrary, problems of complicated manufacturing processes (processes for forming the piezoelectric elements) will arise. Therefore, the number of piezoelectric elements should be decided considering the order of the mass to be sensed, measuring accuracy, and manufacturing costs. As the methods for improving the measuring sensitivity of the mass sensor, other than the above-described method by increasing the number of piezoelectric elements, a method by decreasing the thickness of the diaphragm and increasing the ratio of the mass of the substance to be sensed to the mass of the diaphragm (mass of the substance to be sensed/mass of the diaphragm) is also suitably used.

Next, the aspect of the use of the mass sensor 50 will be described. As an aspect of the use of the mass sensor 50, there is a case where a catching substance reacting with and catching only a substance to be sensed is applied to the diaphragm 2. In this case, since the resonant frequency of the resonating portion in the state where the substance to be sensed has not been caught by the catching substance on the diaphragm 2 differs from the resonant frequency of the resonating portion after the substance to be sensed has been caught, depending on the mass of the substance to be sensed having been caught, the mass of the substance to be sensed having been caught by the catching substance can in turn be measured by measuring change in the resonant frequencies with the piezoelectric element 6. An example of substances to be sensed is an antigen causing disease, and an example of catching substances is an antibody for this antigen.

More specific measurement methods include a method in which a catching substance is applied to the diaphragm 2, the diaphragm 2 is immersed in a liquid containing a substance to be sensed, or exposed to a gaseous atmosphere such as a particular gas, the substance to be sensed is allowed to be caught by the catching substance to change the mass of the diaphragm 2, and change in the resonant frequencies of the resonating portion is measured by the piezoelectric element 6. The resonant frequencies can also be measured after drying the diaphragm 2 in the air after the diaphragm 2 to which the catching substance is applied is immersed in a liquid, and the substance to be sensed is caught by the catching substance. Here, it is needless to say that the above-described various oscillation modes can be used, and various modes of structures and numbers of piezoelectric elements can be suitably selected.

The mass sensor 50 can also be used for measuring decrease in the mass, when the mass of the diaphragm 2 decreased from the initial state. For example, when the applied catching substance is peeled off for some reason, when an extremely small quantity of substance applied to the diaphragm 2 is corroded or dissolved in a particular solution, or when a particular chemical substance other than a catching substance is applied to the diaphragm 2, the sensor 50 can be suitably used for measuring change in the mass of these substances due to peeling off, corrosion, dissolution, or evaporation.

As described above, by applying the measurement principle in which the mass sensor 50 is placed in the environment to change the resonant frequencies of the resonating portion, the mass sensor 50 can be used for measuring various physical and chemical quantities. Although details will be described later, the mass sensor 50 can be used as a thickness gauge of vapor-deposited films or a dew indicator utilizing change in the mass of a substance deposited on the diaphragm, a vacuum gauge, a viscosity meter, or a temperature sensor utilizing the environment where the diaphragm is placed, such as vacuum, viscosity and temperature.

Figure 7:
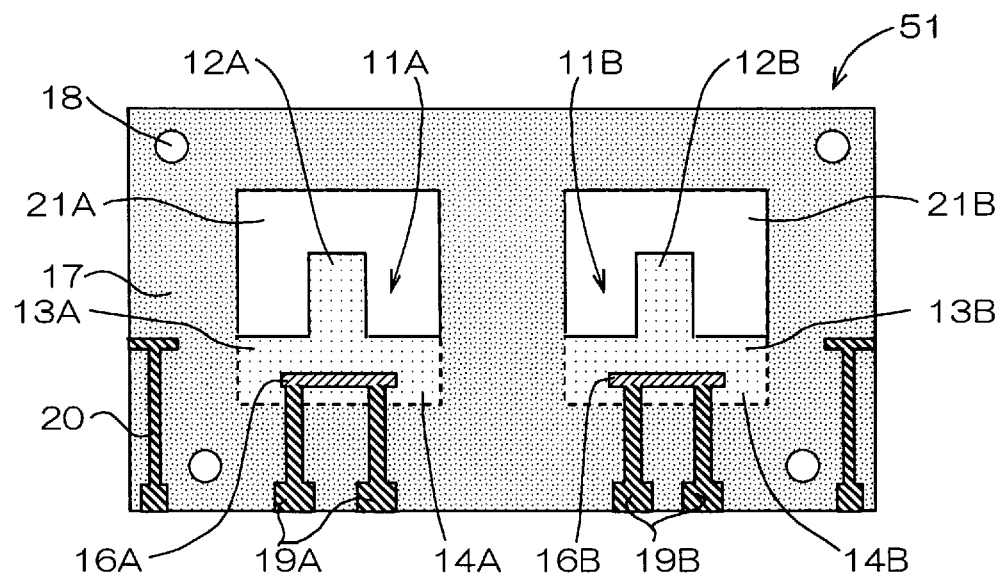
FIG. 7 is a plan showing another embodiment of a mass sensor of the present invention.

Next, a plan of a mass sensor 51, which is another embodiment using the above-described mass sensor 50, is shown in FIG. 7. In the mass sensor 51, two resonating portions (resonating portions 11A, 11B) having the same structure as in the mass sensor 50 are formed. Since the detailed construction of these resonating portions 11A, 11B is the same as that of the mass sensor 50, it is not described here. Although the using method of the resonating portions 11A, 11B is similar to the using method of the mass sensor 50, by forming two or more resonating portions in a sensor as the mass sensor 51, the dynamic range can be expanded by integrating the signals from each resonating portion, and at least one resonating portion can be used for reference or for measuring other physical quantities.

A reference hole 18 formed in the sensor substrate 17 is provided as an alignment mark used in packaging and manufacturing processes of the mass sensor 51, and the sensor substrate 17 is preferably integrally formed by laminating a vibrating plate and a base plate as in the mass sensor 50. It is also preferable that diaphragms 12A, 12B, sensing plates 14A, 14B, and connecting plates 13A, 13B in the resonating portions 11A, 11B are integrally formed from the vibrating plate. Electrode leads 19A, 19B are provided from piezoelectric elements 16A, 16B each having a pair of electrodes provided on the surfaces of the sensing plate 14A, 14B, to the bottom of the sensor substrate 17, and the ends of the electrode leads 19A, 19B are connected to terminals and the like on the measuring apparatus side such as the probe.

Furthermore, a position sensor 20 comprising a pair of electrodes is provided on the mass sensor 51. The position sensor 20 conducts electricity when the mass sensor 51 is immersed in a conductive specimen such as an aqueous solution, and senses the position of the immersed mass sensor 51. That is, for a conductive specimen, when the portion of the position sensor 20 higher than the horizontally formed pattern is immersed in the specimen, and the portion of the mass sensor 51 lower than the position at which the position sensor 20 responds is not immersed in the specimen, the short-circuiting of the piezoelectric elements 16A, 16B and the electrode leads 19A, 19B can be prevented. It is needless to say that the position sensor 20 can also be formed on the sensor substrate 7 in the above-described mass sensor 50. However, when the piezoelectric elements 16A, 16B and the electrode leads 19A, 19B are coated by an insulation resin or the like, since the short-circuiting of the piezoelectric elements 16A, 16B and the electrode leads 19A, 19B can be prevented even if the mass sensor 51 is immersed in a conductive specimen, the provision of the position sensor 20 is not necessarily required. Also, when the mass sensor is immersed in a liquid, and the depth of the mass sensor is controlled, the depth of the mass sensor can easily be controlled by the position sensor 20.

In the mass sensor 51, resonating portions 11A, 11B are provided utilizing the circumferences of through-holes 21A, 21B provided in the sensor substrate 17. That is, resonating portions 11A, 11B are provided deeming a part of the circumferences of through-holes 21A, 21B as the concave portion 8 of the sensor substrate 7 in the mass sensor 50. Thus, it is also preferable that the mass sensor of the present invention has a structure in which one or more through-hole is formed in the sensor substrate, and resonating portions are provided so that two sensing plates and two connecting plates are fitted in each through-hole.

On the other hand, the resonating portions may be provided on the peripheral portion of the sensor substrate. For example, an aspect is considered in which a concave portion is provided on the upper edge of the mass sensor 51 shown in FIG. 7, and the resonating portion is placed in this concave portion. In this case, however, since the thin diaphragms 12A, 12B protrude from the peripheral portion of the sensor substrate 17, care should be taken not to damage the diaphragms 12A, 12B during handling the mass sensor 51. Therefore, when the protection of resonating portions 11A, 11B from external impacts is considered, it is preferable to adopt the structure having resonating portions 11A, 11B inside the sensor substrate 17 as FIG. 7 shows. Such a structure is also preferable for facilitating the manufacture of mass sensors as described below. Furthermore, it is feasible to decrease noise by increasing the distance between the diaphragms 12A, 12B and the upper sides of the through-holes 21A, 21B to reduce the influence of the reflected waves of sensor oscillation. For decreasing noise, it is preferable to make the area of the through-holes 21A, 21B several times larger than the area of the resonating portions.

It is preferable to attempt the reduction of noise due to the reflected waves of sensor oscillation by considering the structure of the mass sensor itself, and when the mass sensor is used in a liquid, considering the material and shape of the container of the liquid. For example, in order to reduce the reflection from the wall of the container, it is preferable to use a flexible resin or the like as the material for the container, or to coat the internal wall of the container with a flexible resin such as a rubber-like or gel-like silicone resin or a elastic epoxy resin. In this time, it is also preferable to select the material considering the frequency band of sound waves. Furthermore, it is preferable to change the shape of the container depending on the oscillation mode of the diaphragm so that the reflected waves are not returned.

Next, the method for using a mass sensor 51 of the present invention will be described when the mass sensor 51 is used as an immune sensor. One of two resonating portions 11A, 11B (11A) is used as a sensing resonating portion 11A. To the diaphragm 12A of the sensing resonating portion 11A is applied a catching substance which reacts with only a substance to be sensed, such as a pathogenic virus, and catches it. For example, the combination of an antigen as the substance to be sensed, and an antibody as the catching substance can be used. The examples of such combinations include human serum albumin/anti-human serum albumin antibody and human immunoglobulin/anti-human immunoglobulin antibody. Whereas, the other resonating portion 11B is used as a referencing resonating portion 11B, to the diaphragm 12B of which no catching substance is applied.

Both resonating portions 11A and 11B are immersed in or placed on the same specimen. When the substance to be sensed in the specimen reacts with and is caught by the catching substance, the mass of the diaphragm 12A of the sensing resonating portion 11A increases, and the resonant frequency of the resonating portion 11A changes corresponding to increase in the mass of the diaphragm 12A. By checking change in the resonant frequency of the resonating portion 11A, whether or not the substance to be sensed has been caught by the diaphragm 12A, that is, whether or not the substance to be sensed is present in the specimen, and increase in the mass can be measured. In many cases, since specimens are fluids such as liquids or gases, the specimens can be tested by comparing the signals from the resonating portions 11A and 11B, without being influenced by the physical properties of the specimens such as type, flow, and temperature of the fluid, or the testing environment.

When the resonating portions 11A and 11B are used as the sensing resonating portion 11A and the referencing resonating portion 11B, respectively, the adhesion of the substance to be sensed onto the referencing resonating portion 11B can be decreased or prevented, and the accuracy of measurement is enhanced by coating the referencing resonating portion 11B with Teflon. Also in the sensing resonating portion 11A, it is preferable to coat the portion other than the diaphragm 12A with Teflon for selectively catching the substance to be sensed only on the diaphragm 12A enhancing the accuracy of measurement. Furthermore, since the catching substance such as expensive antibodies is applied to a minimum necessary portion, it is also preferable for the economical reason.

On the other hand, it is possible to use a method with an expanded dynamic range by applying the same catching substance to the diaphragms 12A, 12B of the resonating portions 11A, 11B, and integrating the signals from the resonating portions 11A, 11B. Furthermore, it is also possible not to use the referencing resonating portion 11B for referencing, but applying a catching substance different from that applied to the sensing resonating portion 11A for sensing different types of substances to be sensed simultaneously.

The mass sensor 51 has a structure to be arranged in the lateral direction (horizontal direction) of the sensor substrate 17 in FIG. 7, so that both the two resonating portions 11A, 11B are simultaneously immersed in the specimen, when the mass sensor 51 is immersed in a specimen of a liquid or the like, or when the diaphragms 12A, 12B are immersed in a catching substance for applying the catching substance to the diaphragms 12A, 12B.

Whereas, when the two resonating portions 11A, 11B are arranged in the vertical direction (up-down direction) of the sensor substrate 17, that is, when the two resonating portions 11A, 11B are arranged so that the sensing resonating portion 11A is first immersed in the liquid or the like, and the referencing resonating portion 11B is not immersed in the liquid or the like, it is easy to immerse and apply the catching substance only to the sensing resonating portion 11A, and not to apply any substance to the referencing resonating portion 11B for using it as a sensor such as a temperature compensation sensor.

Next, other embodiments of the mass sensors of the present invention will be described. The mass sensor 52 shown in the plan of FIG. 8(a) is the mass sensor 50 of which the piezoelectric element 6 and the electrode lead 9 to the piezoelectric element 6 are protected by coating with an insulating member, and the insulation layer 36 is covered with a conductive member, and shielded. FIG. 8(b) is an example of sectional views at the broken line AA in FIG. 8(a).

By the insulation layer 36, the entire resonating portion can be immersed in a liquid, and noise such as external electromagnetic waves can be minimized by the shield layer 37, measuring sensitivity and accuracy can be improved. It is needless to say that the formation of such insulation layer 36 and shield layer 37 can be applied to all the mass sensors of the present invention. Although the shield layers 37 are formed on both plate surfaces of the sensor substrate 7 so as to connect electrically through the through-hole 38, the shield layers 37 on both plate surfaces can be connected electrically utilizing the side of the sensor substrate 7. Also as FIGS. 8(a)(b) show, although the shield layers 37 preferably cover the back and sides of the sensor substrate 7, that is, the wiring portion from the periphery, the effect can be achieved if it is formed on at least a part of the surface of the insulation layer 36.

As an insulating member preferably used in the insulation layer 36, insulating resin or glass is used; however, from the point of view of the oscillation damping of the resonating portions, the use of an insulating resin is more preferable. As particularly preferable insulating resin is fluorocarbon resins, and specifically, tetrafluoroethylene-based Teflon (Teflon PTFE), tetrafluoroethylene-hexafluoropropylene copolymer-based Teflon (Teflon FEP), tetrafluoroethylene-perfluoroalkyl vinyl ether copolymer-based Teflon (Teflon PFA), and PTFE/PFA composite Teflon are preferably used. Silicone resins (in particular, thermosetting silicone resins) can also be suitably used, and acrylic resins or epoxy resins can also be used depending on the applications. It is also preferable to form the insulation layer 36 using different materials for the piezoelectric element 6 and its vicinity, and the electrode lead 9 and its vicinity. Furthermore, it is also preferable to add inorganic or organic fillers in the insulating resin to adjust the rigidity of the resonating portion.

On the other hand, for the conductive material for the shield layer 37, a metal is preferably used, including metallic materials feasible for forming films at low temperatures by sputtering and the like, such as aluminum, nickel, copper, palladium, silver, tin, tungsten, platinum, and gold, used alone or as an alloy. Conductive pastes such as conductive adhesives containing the powder of these metals can also be used.

Next, FIG. 9 shows a plan of the mass sensor 60 in which a gap 10 is formed between the sensing plate 4 and the side surface of the concave portion 8 of the above-described mass sensor 50. Thus, the sensing plate 4 has to be joined to at least the bottom of the concave portion 8. Such a structure prevents the attenuation of resonant waveforms when it is used in a liquid.

Next, a plan of the mass sensor 53 in which a spring plate 41 is joined to the connecting plate 3 of the mass sensor 50 is shown in FIG. 10 (a), and a sectional view along the Y axis of FIG. 10(a) is shown in FIG. 10 (b). Here, the spring plate is an element playing a role for reinforcing the connecting plate and adjusting the rigidity of the connecting plate so as to facilitate oscillation in a desired mode. Therefore, it is preferable to join a spring plate 41 to the connecting plate 3, so as to increase the rigidity of the connecting plate, and to make the uniaxial oscillation mode dominant by increasing resonant frequencies to attenuate the X-axis rotation mode and the Y-axis rotation mode of the diaphragm 2. As described later in the description of the method for manufacturing the mass sensor of the present invention, such a spring plate 41 can easily formed integrally with the connecting plate 3 by processing an intermediate plate integrally sandwiched between the vibrating plate and the base plate to a desired shape.

Figure 11:
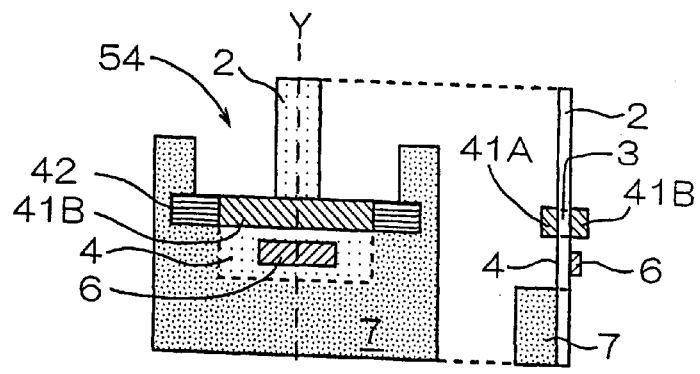
FIGS. 11(a)(b) are diagrams showing still another embodiment of a mass sensor of the present invention; (a) is a plan; (b) is a sectional view.

Although a spring plate 41 is joined to a surface of the connecting plate 3 in the mass sensor 53, spring plates 41A, 41B can be provided on the both surfaces of the connecting plate 3 as in the mass sensor 54 shown in the plan of FIG. 11(a) and FIG. 11(b) which is a sectional view along the Y axis of FIG. 11(a). Here, it is preferable for the manufacturing process to use a spring plate having the same structure as the piezoelectric element 6 for the spring plate 41B formed on the side where the piezoelectric element 6 is provided, because the spring plate 41B and the piezoelectric element 6 can be formed at the same time. However, the electrode on the spring plate 41B is not used as an electrode.

It is also preferable that the spring plate 41B on the piezoelectric element 6 side is formed so that the end of the spring plate 41B is directly joined to the side of the concave portion of the sensor substrate 7, or joined to the side of a spring plate reinforcement 42 joined to the sensor substrate 7. The material of the spring plate reinforcement 42 is preferably the same as that for either the sensor substrate 7 or the piezoelectric element 6.

When a spring plate is formed, in either case where it is joined to one side or on both sides of the connecting plate, the thickness is preferably from 10 to 220 µm, the width is preferably from 50 to 500 µm, and the aspect ratio (width/thickness) of the spring plate is preferably in a range between 0.2 and 50. When the attenuation of oscillation amplitude by the use of the mass sensor of the present invention in a liquid is considered, the thickness is preferably from 10 to 70 µm, the width is preferably from 50 to 500 µm, and the aspect ratio is preferably from 0.7 to 50. More preferably, the thickness is from 10 to 70 µm, the width is from 50 to 300 µm, and the aspect ratio is from 0.7 to 30. The thickness of the spring plate reinforcement, when such a spring plate reinforcement is required, is preferably the same as the thickness of the spring plate being joined to the spring plate reinforcement.

Figure 12:
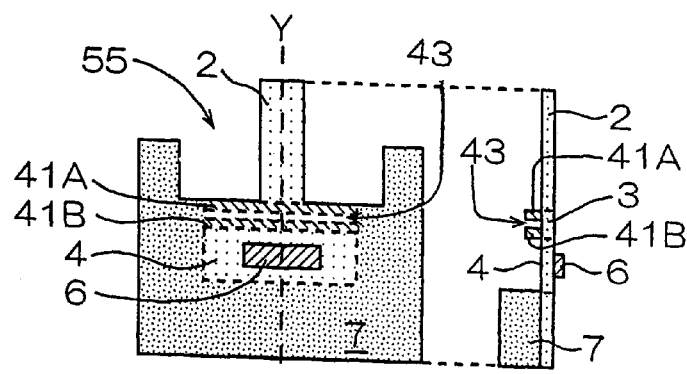
FIGS. 12(a)(b) are diagrams showing still another embodiment of a mass sensor of the present invention; (a) is a plan; (b) is a sectional view.

When a spring plate is joined to the connecting plate, it is also preferable to join two spring plates 41A, 41B to the connecting plate 3 so that a groove 43 is formed as in the mass sensor 55 shown in the plan of FIG. 12(a), and FIG. 12(b) which is a sectional view along the Y axis of FIG. 12(a). Such a structure is preferable because resonant frequencies can be increased while controlling oscillation in the X-axis rotation mode and the Y-axis rotation mode, and the total mass of the connecting plate 3 and the spring plates 41A, 41B can be decreased. This embodiment is also preferable because the driving force from the piezoelectric element 6 can be transmitted to the entire connecting plate 3, that is, the portion consisting of the connecting plate 3 and the spring plates 41A, 41B.

It is preferable for decreasing the mass of the connecting plate to provide a slit, that is an opening portion on the part of the connecting plate 3 contacting the bottom of the groove 43, that is the area of the connecting plate 3 to which spring plates 41A, 41B are not joined. Thus, it is of course preferable to join spring plates 41A, 41B to both surfaces of the connecting plate 3, and to provide a spring plate reinforcement.

Figure 13:
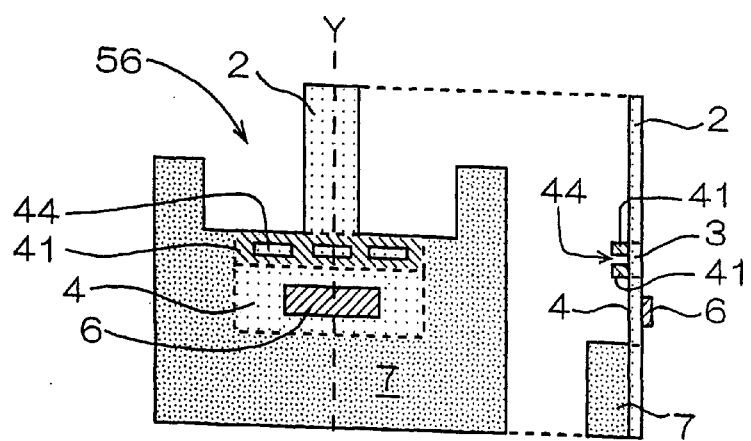
FIGS. 13(a)(b) are diagrams showing still another embodiment of a mass sensor of the present invention; (a) is a plan; (b) is a sectional view.

Next, FIG. 13(a) shows a plan of the mass sensor 56 which is an embodiment in which a spring plate 41 having a cavity portion 44 is joined to the connecting plate 3; and FIG. 13(b) shows a sectional view along the Y axis of the plan. This structure is advantageous in that the oscillation amplitude of the diaphragm 2 increases and resonant frequencies are easily sensed because the driving force of the piezoelectric element 6 is easily transmitted to the entire connecting plate 3 compared with the mass sensor 55.

Although the connecting plate 3 forms the bottom of the cavity portion 44 in the mass sensor 56, a slit may be provided on the portion corresponding to the bottom of the cavity portion 44 of the connecting plate 3, that is, the cavity portion 44 may be fully hollow (aperture). Although three cavity portions 44 are formed in the mass sensor 56, if at least one of the cavity portions 44 is made hollow, the mass of the entire connecting plate 3 can be decreased, and the measuring sensitivity can be improved. However, the hollow should be selectively formed considering the oscillation mode.

Figure 14:
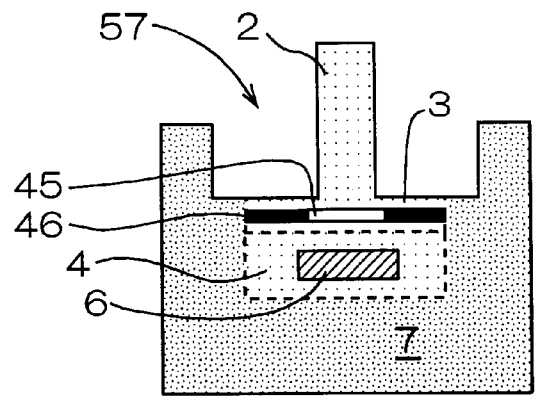
FIG. 14 is a plan showing still another embodiment of a mass sensor of the present invention.

Next, FIG. 14 shows a plan of the mass sensor 57 in which a slit 45 is provided in the connecting plate 3, and a spring plate 46 is formed on the surface of the connecting plate 3 at the both ends of the slit 45. The spring plates 46 may be formed on the both surfaces of the connecting plate 3. Such a structure is preferable because the uniaxial oscillation mode of the diaphragm 2 is made dominant, the recognition of the resonant frequency is easy, and the S/N ratio is improved.

Thus, in the mass sensor of the present invention, various effects are imparted to the mass sensor by variously changing the structure of the connecting plate. Such various aspects of the connecting plate can also preferably be used in other embodiments of the present invention described below.

Figure 15:
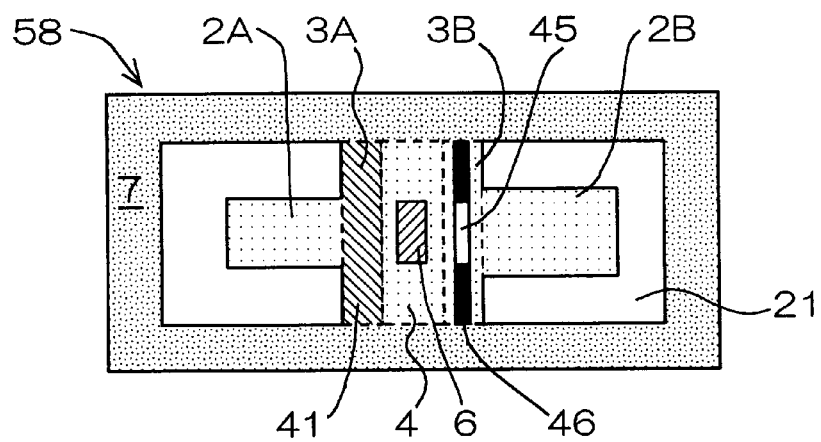
FIG. 15 is a plan showing still another embodiment of a mass sensor of the present invention.

Next, the further embodiment of the mass sensor of the present invention will be described. The mass sensor 58 shown in the plan of FIG. 15 has a structure in which a resonating portion is formed so that a sensing plate 4 having a piezoelectric element 6 is sandwiched between a first connecting plate 3A and a second connecting plate 3B, the first connecting plate 3A is sandwiched between a first diaphragm 2A and the sensing plate 4, and the second connecting plate 3B is sandwiched between a second diaphragm 2B and the sensing plate 4, with respective sides joining in a direction, and the sensing plate 4 and connecting plates 3A, 3B are bridged across the side surfaces facing to each other of the opening 21 provided in a sensor substrate 7. Here, although the sensing plate 4 is joined to the sensor substrate 7, it is not necessarily required to be joined to the sensor substrate 7. That is, the sensing plate 4 may be joined so as to be bridged between the first connecting plate 3A and the second connecting plate 3B without joining to the sensor substrate 7.

In the mass sensor 58, a spring plate 41 is joined to the first connecting plate 3A. On the other hand, a slit 45 is formed in the second connecting plate 3B, and a spring plate 46 is joined to the second connecting plate 3B. However, it is obvious from the description concerning the above-described mass sensors 53 to 57, that these are not necessarily required.

It is not required that the first diaphragm 2A and the second diaphragm 2B are of the same shape. Thus, the provision of two diaphragms is advantageous in that the measuring range can be expanded by determining the size and shape on each diaphragm to meet the desired measuring sensitivity without lowering the sensitivity.

Figure 16:
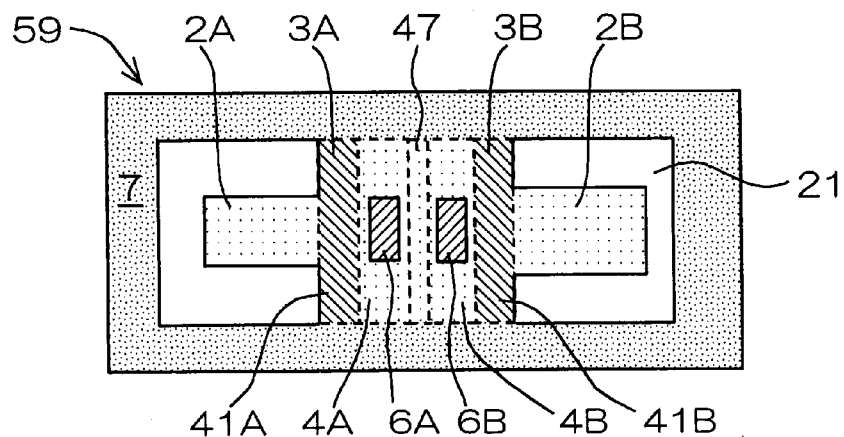
FIG. 16 is a plan showing still another embodiment of a mass sensor of the present invention.
Figure 17:
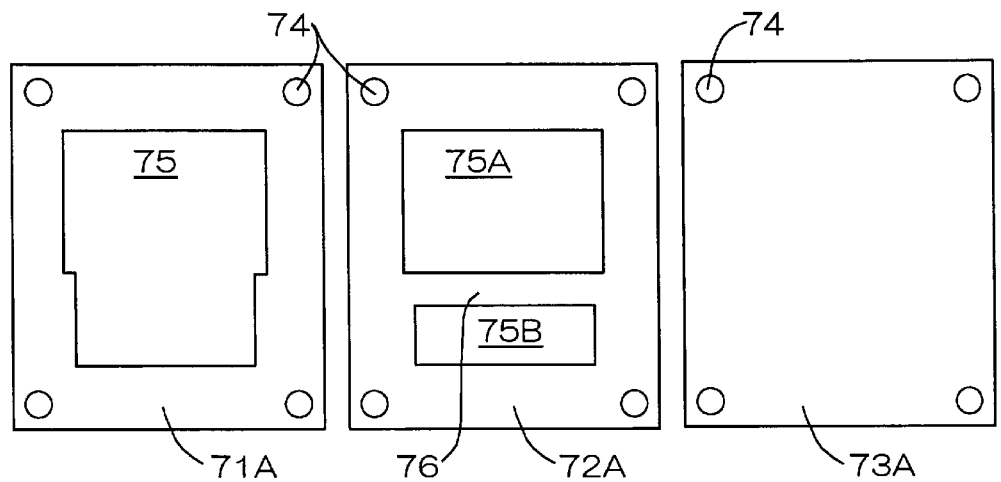
FIG. 17 is a plan showing an example of processing a green sheet for a sensor substrate used in the fabrication of a mass sensor of the present invention.

FIG. 16 is a plan view showing still another embodiment of the mass sensor of the present invention. The mass sensor 59 has a structure in which a resonating portion is formed so that an interference preventing plate 47 is sandwiched between a first sensing plate 4A having a piezoelectric element 6A and a second sensing plate 4B having a piezoelectric element 6B, a first connecting plate 3A is sandwiched between the first sensing plate 4A and a first diaphragm 2A, and a second connecting plate 3B is sandwiched between the second sensing plate 4B and a second diaphragm 2B, with respective sides joining in a direction, and each of the sensing plates 4A, 4B and each of the connecting plates 3A, 3B are bridged across the side surfaces facing to each other of the opening 21 provided in a sensor substrate 7. Although spring plates 41A, 41B are joined to the connecting plates 3A, 3B, respectively, these spring plates are not necessarily required. Although the interference preventing plate 47 and the connecting plates 3A, 3B must be joined to the sensor substrate 7, the sensing plates 4A, 4B are not necessarily required to be joined to the sensor substrate 7.

Since the mass sensor 59 has a structure having two resonating portions apart from each other via the interference preventing plate 47, the interference of the oscillation of each resonating portion can be minimized more effectively by thickening the interference preventing plate 47 by joining a spring plate on it. Since the mass sensor 59 has two resonating portions, it can be used in the same way as the above-described mass sensor 41. Furthermore, if the size of the diaphragms 2A, 2B is changed so as to change the sensitivity of the diaphragms 2A, 2B to the mass, interference of oscillation occurs; however, this interference of oscillation can be controlled and sensing accuracy is improved by providing corresponding piezoelectric elements 6A, 6B on the diaphragms 2A, 2B, respectively, and providing the interference preventing plate 47.

Figure 22:
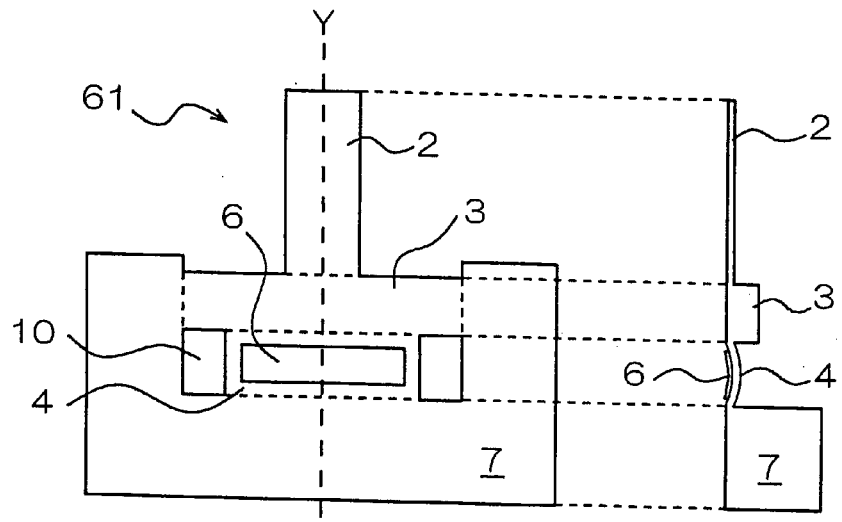
FIGS. 22(a)(b) are diagrams showing still another embodiment of a mass sensor of the present invention; (a) is a plan; (b) is a sectional view.

The mass sensor 61 shown in the plan of FIG. 22(a) and the sectional view of FIG. 22(b) along the Y axis of the plan has a structure in which the shape of the sensing plate 4 and the piezoelectric element 6 in the mass sensor 60 shown in FIG. 9 are convexly bent toward the sensing plate 4 in the state where no driving voltage is applied to the piezoelectric element 6. As the piezoelectric element 6 in this case, it is preferable to provide a piezoelectric element 88 of the type utilizing $d_{31}$ shown in FIG. 2. In the mass sensor 61, the connecting plate 3 is formed to be thicker than the sensing plate 2.

Figure 23:
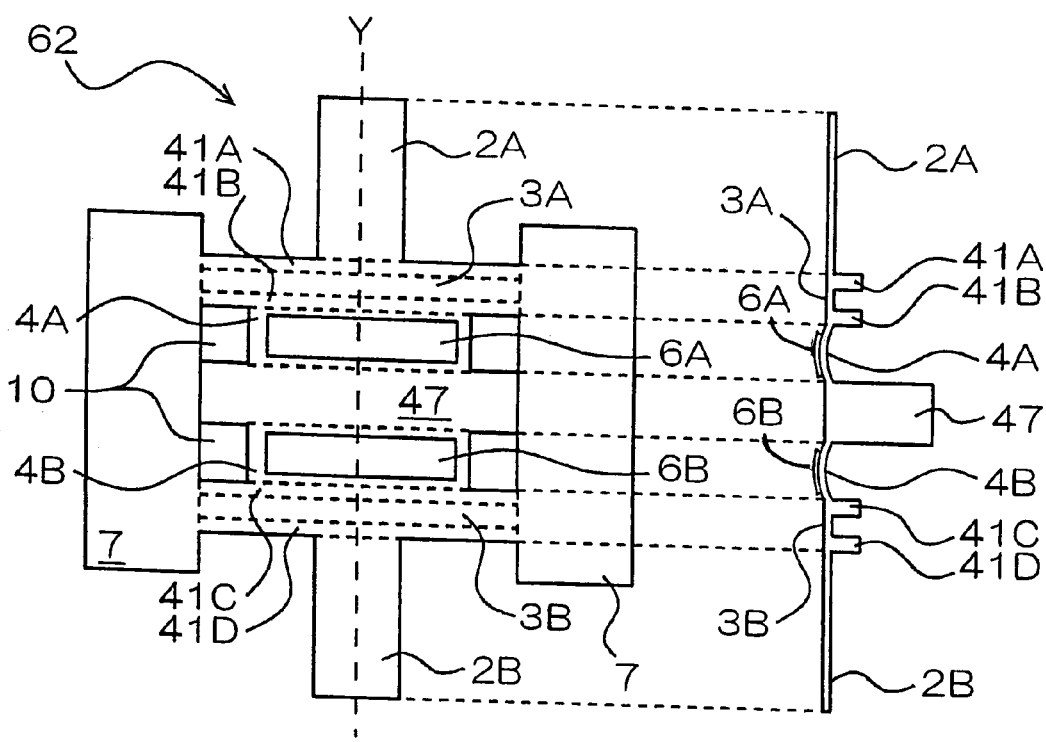
FIGS. 23(a)(b) are diagrams showing still another embodiment of a mass sensor of the present invention; (a) is a plan; (b) is a sectional view.

The mass sensor 62 shown in the plan of FIG. 23(a) and the sectional view of FIG. 23(b) along the Y axis of the plan has a structure similar to the structure of the mass sensor 59 shown in FIG. 16. That is, the mass sensor 62 has a structure in which a gap 10 is formed so that the sensing plates 4A, 4B are not directly joined to the substrate 7, the interference preventing plate 47 sandwiched between the sensing plates 4A, 4B is formed to be thicker than the sensing plates 4A, 4B, spring plates 41A to 41D are joined to the connecting plates 3A, 3B, and the sensing plates 4A, 4B and the piezoelectric elements 6A, 6B are convexly bent toward the piezoelectric elements 6A, 6B in the state where no driving voltage is applied to the piezoelectric elements 6A, 6B. As the piezoelectric elements 6A, 6B in the mass sensor 62, it is preferable to provide piezoelectric elements 94A, 94B of the type utilizing $d_{33}$ shown in FIGS. 3 or 4.

Thus in some cases, it is preferable in the mass sensor of the present invention to bend the shapes of the sensing plate and the piezoelectric element previously, as shown by the mass sensors 61 and 62. Also in devices having a plurality of sensing plates and piezoelectric elements, respective sensing plates and piezoelectric elements are not necessarily required to be bent in the same direction, but the bending direction can be suitably selected considering the shape and the like of the piezoelectric elements.

Various embodiments of the mass sensors according to the present invention have been described above. Now, the method for fabricating a mass sensor of the present invention will be described using the mass sensor 53 as an example. As the materials of the sensor substrate 7, ceramics such as zirconia are suitably used. A slurry is produced by mixing a binder, solvent, dispersing agent, and other additives with ceramic powder, and after removing foams from the slurry, a green sheet or a green tape for the vibrating plates, intermediate plates and base plates having desired thickness using a method such as the reverse roll coater method and the doctor blade method is formed. In the case of the mass sensor 50 in which the spring plate 41 is not provided, it is not required to produce the green tape for intermediate plates.

Next, these green sheets or the like are punched using a die or laser to form a green sheet 72A for an intermediate plate having a reference hole 74, openings 75A, 75B, and a spring plate 76; a green sheet 71A for a base plate having a reference hole 74, and an opening 75; and a green sheet 73A for a vibrating plate having a reference hole 74.

Here, although portions to become the opening 75 or the diaphragm 2 can be formed in the green sheet 73A for a vibrating plate, since the green sheet 73A for a vibrating plate is usually as thin as 20 μm or less, it is preferable to obtain the desired shape using laser or the like after the sensor substrate 7 has been formed and the piezoelectric element 6 has been provided, for securing the flatness and the dimensional accuracy of the diaphragm 2, the connecting plate 3, or the sensing plate 4 formed in the vibrating plate 73B after sintering. The vibrating plate 73B is a plate obtained by sintering the green sheet 73A for a vibrating plate.

The green sheets 71A to 73A fabricated as described above are stacked one by one in the order of that for a vibrating plate, for an intermediate plate, and for a base plate so as to align the locations of reference holes 74, integrated under applying heat and pressure or the like, and sintered. Thus, there is formed a sensor substrate 7 in which all of the green sheets 71A to 73A are laminated, and the peripheral portion is integrally formed; and a connecting plate 3 is integrally formed from the laminated portion of the vibrating plate 73B and the portion of the intermediate plate 72B to be the spring plate 76. The intermediate plate 72B is a plate obtained by sintering the green sheet 72A for an intermediate plate.

Next, the method for forming a piezoelectric element 6 consisting of a first electrode, a piezoelectric film, and a second electrode on the predetermined location of the vibrating plate 73B will be described. The configuration of the piezoelectric element 6 has already been shown in FIGS. 2 to 4. The piezoelectric element 6 can be formed using various forming methods depending on the state before or after sintering the green sheets 71A to 73A. First, forming methods before sintering the green sheets 71A to 73A include a method in which a piezoelectric film is formed by press molding using a mold or tape forming using a slurry material, the piezoelectric film before sintering is laminated on the p redetermined location of the green sheet 73A for a vibrating plate, and is integrally sintered together with other green sheets 71A, 71B. In this case, it is required to form the electrode previously on the green sheet 73A for a vibrating plate or on the piezoelectric film by the film forming method described below.

Although the temperature for sintering the piezoelectric film is determined depending on the constituting material, it is generally 800° C. to 1400° C., preferably 1000° C. to 1400° C. In this case, it is preferable for controlling the composition of the piezoelectric film 23, that sintering is conducted under a controlled atmosphere in the presence of the evaporation source of the material for the piezoelectric film. It is preferable that the above-described atmosphere is controlled for relieving the sintering stress of the piezoelectric film when the sensor substrate after sintering is used as described later, and for obtaining higher material properties, by observing the piezoelectric film after sintering with an electron microscope or the like, and monitoring the distribution of components.

For example, when a material containing lead zirconate is used such as a material containing lead zirconate, lead titanate, and lead magnesium niobate as its main components, which is a piezoelectric ceramic material preferably used in the present invention, it is preferable to adjust the atmosphere so that the zirconium component segregates in the sintered piezoelectric film and to conduct sintering. It is further preferable to adjust the atmosphere so that the segregation of the zirconium component is observed on the surface of the piezoelectric film, and is hardly observed inside the piezoelectric film. Since the piezoelectric film having such a component distribution has more excellent oscillation characteristics, that is, a larger oscillation amplitude than piezoelectric films without segregation, and sintering stress is relieved by the segregation of zirconium components, material properties that the powder of the piezoelectric materials inherently possesses are maintained without lowering significantly.

Therefore, it is most preferable in the mass sensors of the present invention to form the piezoelectric element having such a piezoelectric film. It is also preferable to use the above-described piezoelectric film composition, as well as to adjust the atmosphere so that the components of the piezoelectric material are contained; especially when the piezoelectric material contains the above-described titanium oxide, the titanium oxide is contained, after sintering in every member of the mass sensor, such as the connecting plate, the spring plate, and the sensor substrate. When the sintering of the piezoelectric film and the sintering of the sensor substrate are performed at the same time, it is required to match both sintering conditions. Such a piezoelectric film can be suitably applied not only to mass sensors, but also to devices having film-type piezoelectric elements as a component, such as actuators and sensors.

On the other hand, various film forming methods can be used for providing the piezoelectric element 6 on the sensor substrate 7 after sintering. The examples of the methods include various thick film forming methods, such as screen printing, dipping, coating, and electrophoresis; or various thin film forming methods, such as the ion beam method, sputtering, acuum deposition, ion plating, chemical vapor deposition (CVD), or electroplating. Among these, for the formation of the piezoelectric film in the present invention, thick film forming methods using screen printing, dipping, coating, and electrophoresis are preferably used. These methods are used for forming the piezoelectric film using paste, slurry, suspension, emulsion, or sol consisting mainly of the particles of piezoelectric ceramics having an average particle diameter of 0.01 to 5 μm, preferably 0.05 to 3 μm, and despite the simple methods, favorable piezoelectric properties can be obtained. Electrophoresis is advantageous for forming films having high density and high dimensional accuracy, and has features as described in the article of Kazuo Anzai, "DENKIKAGAKU," 53, No. 1 (1985), pp. 63–68. Accordingly, it is preferable to select an optimal method considering the accuracy and reliability to be required.

Specifically, after the sensor substrate 7 has been sintered, the first electrode is printed and sintered on the predetermined surface area of the vibrating plate 73B, then the piezoelectric film is printed and sintered, and further, the second electrode is printed and sintered to form the piezoelectric element 6. Then, electrode leads 9 are printed and sintered for connecting the respective electrodes to the measurement apparatus, and if polarization is required, they are polarized. Here, for example, if platinum (Pt) is used for the first electrode, lead zirconate titanate (PZT) is used for the piezoelectric film, gold (Au) is used for the second electrode, and silver (Ag) is used for the electrode leads, sintering temperatures in the sintering process can be lowered stepwise. Therefore, the previously sintered materials are not re-sintered or aggregated in the sintering step of a certain material, and the occurrence of troubles in the material for electrodes or the like, such as peeling off and breaking due to aggregation, can be avoided.

By selecting suitable materials, the respective members and leads for the piezoelectric element 6 can be printed one after the other, and the piezoelectric element 6 can be integrally sintered at once. It is also possible to print respective members and electrode leads of the piezoelectric elements 6A, 6B one after the other on a green sheet 73A for a vibrating plate, and to sinter it integrally with other green sheets 71A, 72A. Further, respective electrodes or the like may be provided at a low temperature after the piezoelectric film was formed. Also, the respective members and electrode leads of the piezoelectric element 6 can be formed by a thin film forming method, such as sputtering or vapor deposition. In this case, heat treatment is not necessarily required.

Thus, it is particularly preferable to form the piezoelectric element 6 using the above-described various film formation methods, in particular, the thick film formation method, since the piezoelectric element 6 and the sensing plate 4 can be integrally joined and installed without using adhesives, and the mass sensor excels in reliability and reproducibility, and is easily integrated. Here, the piezoelectric film may be suitably patterned, and the methods for patterning include, for example, screen printing, photolithography, laser processing, or mechanical processing such as slicing and ultrasonic processing.

Next, a diaphragm 2, a sensing plate 4, and the like are formed on the predetermined area of thus formed sensor substrate. Here, it is preferable to remove the unnecessary part of the diaphragm 2 leaving the site integrally joined to the sensor substrate 7, such as the diaphragm 2 and sensing plates 4A, 4B by trimming using the fourth harmonic of YAG laser. At this time, the resonant frequency of the resonating portion can be adjusted to a predetermined value by adjusting the shapes of the diaphragm 2 or the like, and the mass range of the detectable substance to be sensed can be determined. It is also possible to form the slit 45 easily.

The shape of the diaphragm 2 is not limited to rectangular, but the diaphragm 2 can also be trimmed during shape forming to become various shapes, such as circular, inverted triangular, and polygonal. That is, the shape of the diaphragm 2 in the mass sensors of the present invention is not limited to a particular shape, but can be adequately determined for saving the space for installing the diaphragm 2, and for increasing the area of the diaphragm 2.

Figure 18:
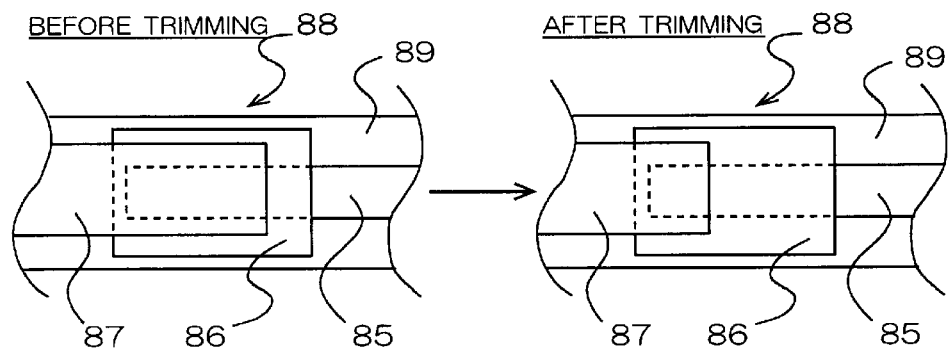
FIG. 18 is a diagram illustrating an example of methods for the fabrication of a piezoelectric element used in a mass sensor of the present invention.
Figure 19:
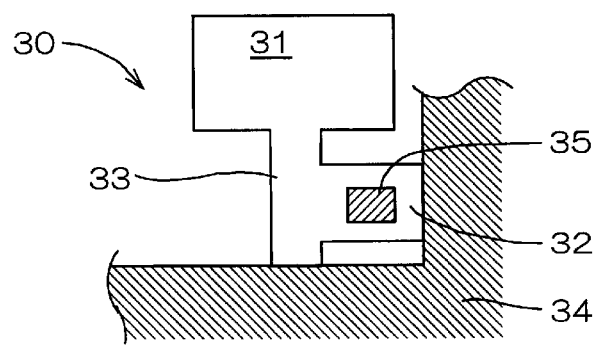
FIG. 19 is a sectional view showing a basic structure of a micro-mass sensor.

Furthermore, as FIG. 18 shows, when a laminated piezoelectric element 88 shown in FIG. 2 is installed, the upper second electrode 87 can be trimmed by the fourth harmonic of YAG laser to adjust the available electrode area of the piezoelectric element 88 and adjust sensitivity. When the structure of the piezoelectric element is a comb structure as shown in FIGS. 3 or 4, part of one or both electrodes may be trimmed.

In processing such a resonating portion or a piezoelectric element 6, various processing methods suitable for the size and shape of the resonating portion, such as laser processing with YAG laser, the second or third harmonic of YAG laser, excimer laser, or $CO_2$ laser; electron beam processing; and dicing (machining), in addition to the fourth harmonic of YAG laser described above, can be used. In addition to the method using green sheets as described above, the sensor substrate 7 can be produced by the press molding, casting, or injection molding using molds. In these cases also, machining such as cutting, grinding, laser processing, and ultrasonic processing is conducted before and after sintering, and the mass sensor of a predetermined shape is obtained.

When the piezoelectric element 6 and electrode leads 9 in thus fabricated mass sensor 53 are insulated, an insulation layer 36 can be formed by screen printing, coating, or spraying. Here, when glass is used as the material, the entire mass sensor 53 must be heated to the softening point of the glass, and since glass has a high hardness, oscillation may be inhibited. However, since the resin is soft, and only such processing as drying is required, the use of a resin is preferable for both manufacturing processes and oscillation properties. When fluorocarbon or silicone resins suitably used in the present invention are used in the insulation layer 36, it is preferable to form a primer layer suited to the types of the resin and ceramics used, for improving the adhesion with the underlying ceramics (the sensor substrate 7), and to form the insulation layer 36 on the primer layer.

Next, when a shield layer 37 comprising a conductive material is further formed on the insulation layer 36 made of a resin, since sintering is difficult, a method not requiring heat, such as sputtering, is used when various metallic materials are used as conductive members; however, when a conductive paste comprising metal powder and a resin is used, screen printing or coating can be used preferably. If the insulation layer 36 is made of glass, a conductive paste can be screen-printed, and sintered or fired below a temperature at which the glass flows.

Finally, a catching substance or the like is applied to the diaphragm 2 or entire resonating portion to complete the mass sensor 53. The measurement of resonant frequencies is performed using an impedance analyzer or a network analyzer, or by the SINSWEEP system, or through the measurement of transfer functions by oscillating by external ultrasonic waves. Furthermore, change in the mass of the diaphragm 2 can be measured from change in the resonant frequencies.

Although the mass sensors of the present invention have been described in detail above, the mass sensors of the present invention can also be used for other applications by applying their measurement principle as described above. First, when the catching substance applied to the diaphragm is a moisture adsorbing material, the mass sensor can be used as a moisture meter. When applying to the diaphragm an adsorbing material that adsorbs a specific gaseous component, or an organic or inorganic substance as a catching substance, the mass sensor can be used as a gas sensor, an odor sensor, or a taste sensor. Furthermore, if the temperature of the diaphragm is controlled to make moisture condense, the mass sensor can be used as a dew indicator which measures the dew point from the temperature when the mass of the diaphragm is increased.

In addition, as a catching substance, magnetic material can be formed on the diaphragm in shape of a film taking advantage of its magnetism of various kinds of absorption sensor which can absorb substances on a selective bases. Here, the magnetic materials include in general metal elements of ferrite related materials (such as $M_1$: Mn, Fe, Co, Ni, Cr, Zn, Mg, Cd, Cu, Li, Y, and Gd, etc.) generally expressed as $M_1O.Fr_2O_3$ or compounds of these elements (such as $M_1$:Mn—Zn, Ni—Zn, Mg—Mn, Ni—Cu, Cu—Zn, Li—Zn, Mg—Zn, etc.) and the metal elements of the permalloy related materials (such as $M_2$: Ta, Zr, Nb, Co, Mo, Cu, W, Mn, V, Cr, and Si, etc.) expressed as Fe—Ni or Fe—Ni—$M_2$ or compounds of these elements, and further Fe—Al—Si (sendust) related materials, materials, Fe—(Ta, Zr, Nb)—X related materials (X: N, C, O), Fe—Co related materials, Fe—Cr—Co related materials, Co—Cr related materials, Co—Ni—Mn—P related materials, Fe—Al—Co—Ti—Cu related materials, or otherwise, $SmCo_5$ alloy, $Sm_2T_{17}$ alloy (T: 3d transition element), rare-earth related materials such as $Nd_2Fe_{14}B$ alloy, etc. These materials can be shaped as a film such as by sputtering, vacuum deposition, plating, CVD, etc.

The mass sensor can also be used as a film thickness gauge. The films that can be measured include sputtered films or CVD films formed in vacuum, LB films formed in gases, or electrodeposited films formed in liquids. When these films are formed, if the diaphragm or the resonating portion of the mass sensor is placed in the same film forming environment, a film is formed on the diaphragm or the resonating portion causing change in the mass, and change in resonant frequency, the thickness or the growing speed of the formed film can be measured.

Figure 20:
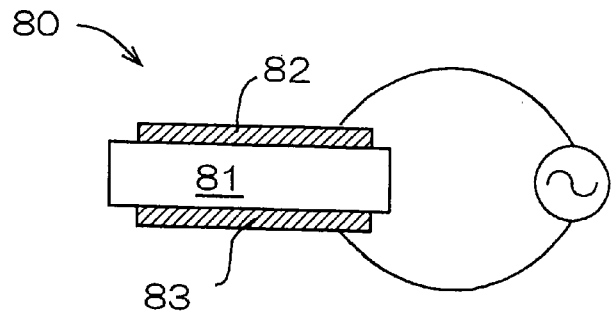
FIG. 20 is a sectional view illustrating the basic structure of a conventional mass sensor.

Although a quartz vapor deposited film thickness gauge has been known to detect change in the resonant frequency of a quartz oscillator 81 similar to the one shown in FIG. 20 in the slipping oscillation (shear mode oscillation) when the film thickness changes, it has problems in that it is affected by change in temperature, noise due to the collision of impurities, and change in vacuum pressure, because the quartz oscillator 81 itself is used in a vapor deposition environment.

Whereas, if the mass sensor of the present invention is used in the uniaxial oscillation mode as a vapor deposited film thickness gauge, the resonating portion resists change in temperature because it oscillates in the rigid body mode of the diaphragm, the probability of the collision of impurities is low because the diaphragm is as thin as 3 to 20 µm, and a structure in which the resonating portion is easily held in a constant environment, the measurement accuracy can be improved compared with the case where a quartz oscillator 79 is used.

Furthermore, the mass sensor can be used as a viscosity meter to cause the shear waves of transverse waves to occur in a fluid when the diaphragm is immersed in the liquid, and receive the mass load of the portion where viscous waves enter. Here, when the uniaxial oscillation mode is used for measurement, since the portions other than the diaphragm are not required to be immersed in the liquid, the resonating portion resists change in temperature because it oscillates in the rigid body mode, and the probability of the collision of impurities is low because the diaphragm 19 is as thin as 3 to 20 µm, the measurement accuracy can be improved. Although a quartz viscosity meter for detecting change in the resonant frequency of a quartz oscillator in the slipping oscillation (shear mode oscillation) has also been used, it has problems in that it is affected by change in temperature, and noise due to the collision of impurities in the liquid, because the quartz oscillator itself is immersed in the liquid.

Furthermore, a quartz oscillator is used as a friction vacuum gauge since its electric resistance varies due to the friction of gas molecules and the viscous friction of the gas in a vacuum. However, since this type of vacuum gauge is used to measure change in frequencies based on the mass load effect of the quartz oscillator, the mass sensor of the present invention utilizing basically the same measurement principle can also be used as a vacuum gauge.

Figure 21:
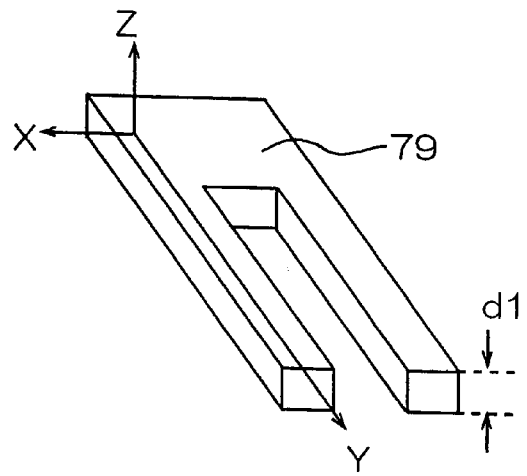
FIG. 21 is a perspective view showing a structure of a quartz oscillator of a conventional quartz friction vacuum gauge.

Although a friction vacuum meter using a quartz oscillator detects change in resistance values when the tuning fork-shaped oscillator 79 is oscillated in the X-axis direction as FIG. 21 shows, it is difficult to decrease the thickness d1 of the oscillator 79, and therefore, the improvement of sensitivity is difficult. Whereas, in the mass sensor, the thickness of the diaphragm can be decreased to 3 to 20 µm, and the uniaxial oscillation mode can be used, sensitivity can be improved.

In addition, the mass sensor of the present invention can be used as a temperature sensor by using the bending mode of the diaphragm, that is, by sensing change in the Young's modulus as change in resonant frequency in the bending mode.

Although the mass sensor can be used as various sensors, the basic principle of measurement is to measure change in the resonant frequency of the resonating portion on the basis of the mass load to the diaphragm. Therefore, a plurality of resonating portions having different functions can be formed easily in one mass sensor. For example, the functions of a temperature sensor, a vacuum gauge, or a viscosity sensor can be added to the function as the mass sensor, that is, a sensor for referencing for the compensation of temperature, vacuum, or viscosity can be easily incorporated in the mass sensor. In such cases, since the use of a plurality of sensors having different shapes for different applications is not required, it is also advantageous from the costs for the incorporation of sensors to the place of measurement and their handling, and for the measuring instruments.

In the above-described mass sensor of the present invention and mass sensors for other applications a piezoelectric transducer using a piezoelectric film that utilizes the piezoelectric effect is used as a device for sensing the oscillation of a resonating portion and transducing the oscillation to electric signals or energy. However, such oscillation signal or energy transducing devices are not limited to those utilizing the piezoelectric effect, but may be constituted by those utilizing electromagnetic induction, change in electrostatic capacity, change in incident light, change in electric resistance, or pyroelectricity.

For example, those utilizing electromagnetic induction include those having a coil installed on the sensing plate, an electric circuit for detecting electric signals flowing in the coil, and a magnet (may be an electromagnet) for generating a magnetic field in the coil. In this case, when the coil oscillates together with the resonating portion, an electric current flows through the coil due to electromagnetic induction, and the electric current is detected by the electric circuit. Those utilizing change in electrostatic capacity include those having a pair of electrodes installed on the surface of the sensing plate, a dielectric sandwiched by these electrodes, and an electric circuit connected to these electrodes, and detecting the electrostatic capacity charged in this specific space with the electric circuit.

Those utilizing change in incident light include those having a device for illuminating the resonating portion such as a photodiode, and a device for measuring the quantity of light reflected by the resonating portion (light receiver). This light receiver may be a photo sensor. As the resonating portion oscillates, the quantity of light reflected by the resonating portion changes, and change in the quantity of the incident light is measured by the light receiver.

Those utilizing change in electric resistance are roughly divided into that using a conductor and that using a semiconductor. That using a conductor has a conductor provided on the surface of the resonating portion, and an electric circuit connected to the conductor. Since the conductor is distorted by oscillation when the conductor oscillates together with the resonating portion and its resistance changes, this change in resistance is detected by the electric circuit. That using a semiconductor uses a semiconductor in place of the conductor.

Those utilizing pyroelectricity include those comprising a pair of electrodes provided on the surface of the sensing plate, a pyroelectric member formed between these electrodes, an electronic circuit connected to the electrodes, and a heat source of infrared or the like, and detecting pyroelectric current generated by oscillation with the electronic circuit.

These types of oscillation signal transducer can be used in place of the piezoelectric elements described above, and in addition, different signal transducers can be used for driving of the resonating portion and for sensing the oscillation from the resonating portion separately. For example, a piezoelectric transducer can be used for driving, and an electrostatic capacity-type transducer for sensing. The arrangement of driving and sensing devices can be selected suitably and conveniently depending on the number of sensing plates. For example, when only one sensing plate is used, they can be arranged on the surface of the sensing plate; when two sensing plates are used, they can be arranged on both surfaces of the two, or on each surface.

Although the embodiments of mass sensors of the present invention have been described above, it is needless to say that the present invention is not limited to the above embodiments. Therefore, there are many other embodiments in which the features of the above-described embodiments are combined. Also, the embodiments of the present invention can be changed, modified, or improved on the basis of knowledge of those skilled in the art, unless these change, modification, or improvement deviate from the spirit of the present invention.

As described above, a mass sensor and a method for mass sensing of the present invention, exhibit excellent effects in that change in various extremely small masses occurring on a diaphragm, that is, change in mass load on the diaphragm, can be sensed easily and accurately in a short time. Since the mass sensor of the present invention is little affected by the temperature of the specimen or change in the properties of materials for the mass sensor itself due to the temperature of the specimen on sensing resonant frequencies, and can measure an extremely small quantity of a 0.1 nanogram order as the nature of its structure, it exhibits the excellent effect. Also, the mass sensors of the present invention are advantageous in that the measuring sensitivity is improved and resonant frequencies are easily measured by the adoption of the rigid body mode and the optimal design of the shape of the connecting plates. Therefore, when a catching substance for catching various substances to be sensed is applied to the diaphragm, the mass sensor can be used as a gas sensor, taste sensor, odor sensor, immune sensor, or moisture meter, which can sense various chemical substances or microorganisms such as bacteria and viruses easily and quickly. Even when such a catching substance is not applied to the diaphragm, the mass sensor can be used as a film thickness gauge, viscosity meter, vacuum gauge, or thermometer. In addition, when the sensor is used as an immune sensor, an odor sensor, or a taste sensor, the reliability of tests can be improved, because determination does not rely on human sense.

Furthermore, the mass sensor of the present invention has a feature in that a plurality of resonating portions used for sensing different physical and chemical quantities can be provided in a mass sensor easily. Therefore, since the use of a plurality of various discrete sensors is not required, the mass sensor of the present invention also excels in economic effects in the reduction of costs for incorporating the sensor in the measuring location, for facilities for handling or measuring such as measuring instruments, as well as the reduction of costs by the integration and the shared use of manufacturing equipment.

What is claimed is:

1. A mass sensor comprising:

a diaphragm, a sensing plate having a piezoelectric element arranged on at least a part of at least one surface joining respective sides, a connecting plate sandwiched by the diaphragm and the sensing plate, wherein the diaphragm, the sensing plate, the piezoelectric element and the connecting plate form a resonating portion, wherein said connecting plate is bridged across the side surfaces of a concave portion formed in a sensor substrate, and said sensing plate is joined to at least the bottom portion of said concave portion.

2. The mass sensor according to claim 1, wherein a slit portion is provided on said connecting plate.

3. The mass sensor according to claim 1, wherein at least one spring plate or at least one spring plate having a cavity portion is joined to at least one surface of said connecting plate.

4. The mass sensor according to claim 3, wherein a slit portion is provided on an area of said connecting plate where said spring plate is not joined, or at least a part of the area facing to said cavity portion.

5. A mass sensor comprising:

a first connecting plate, a second connecting plate, a sensing plate having a piezoelectric element arranged on at least a part of at least one surface, said sensing plate being sandwiched by the first connecting plate and the second connecting plate, a first diaphragm sandwiching said first connecting plate with said sensing plate, a second diaphragm sandwiching said second connecting plate with said sensing plate, wherein the first connecting plate, the second connecting plate, the piezoelectric element, the sensing plate, the first diaphragm and the second diaphragm form a resonating portion by joining respective sides in one direction, wherein said first and second connecting plates are bridged across the sides facing to each other provided on a sensor substrate.

6. A mass sensor comprising:

a first sensing plate having a piezoelectric element arranged on at least a part of at least one surface, a second sensing plate having a piezoelectric element arranged on at least a part of at least one surface, an interference preventing plate sandwiched by said first sensing plate and said second sensing plate, a first diaphragm, a second diaphragm, a first connecting plate sandwiched by the first sensing plate and the first diaphragm, a second connecting plate sandwiched by the second sensing plate and the second diaphragm, wherein the first sensing plate, the second sensing plate, the piezoelectric element, the interference preventing plate, the first diaphragm, the second diaphragm, the first connecting plate and the second connecting plate form a resonating portion by joining respective sides in one direction, wherein said first and second connecting plates and said interference preventing plate are bridged across the sides facing to each other provided on a sensor substrate.

7. The mass sensor according to claim 6, wherein a spring plate is joined to said interference preventing plate.

8. The mass sensor according to claim 5, wherein one or more slit portion is provided on said first connecting plate, one or more slit portion is provided on said second connecting plate, or one or more slit portion is provided on each of said first and second connecting plates.

9. The mass sensor according to claim 6, wherein one or more slit portion is provided on said first connecting plate, one or more slit portion is provided on said second connecting plate, or one or more slit portion is provided on each of said first and second connecting plates.

10. The mass sensor according to claim 5, wherein at least one spring plate or at least one spring plate having a cavity portion is joined to at least one surface of said first connecting plate, at least one spring plate or at least one spring plate having a cavity portion is joined to at least one surface of said second connecting plate, or at least one spring plate or at least one spring plate having a cavity portion is joined to at least one surface of each of said first and second connecting plates.

11. The mass sensor according to claim 6, wherein at least one spring plate or at least one spring plate having a cavity portion is joined to at least one surface of said first connecting plate, at least one spring plate or at least one spring plate having a cavity portion is joined to at least one surface of said second connecting plate, or at least one spring plate or at least one spring plate having a cavity portion is joined to at least one surface of each of said first and second connecting plates.

12. The mass sensor according to claim 10, wherein:

a slit portion is provided on at least a part of an area of said first connecting plate where said spring plate is not joined, or at least a part of an area facing said cavity portion;

a slit portion is provided on at least a part of an area of said second connecting plate where said spring plate is not joined, or at least a part of an area facing said cavity portion; or a slit portion is provided on at least a part of an area of each of said first and second connecting plates where said spring plate is not joined, or at least a part of an area facing said cavity portion.

13. The mass sensor according to claim 11, wherein:

a slit portion is provided on at least a part of an area of said first connecting plate where said spring plate is not joined, or at least a part of an area facing said cavity portion;

a slit portion is provided on at least a part of an area of said second connecting plate where said spring plate is not joined, or at least a part of an area facing said cavity portion; or a slit portion is provided on at least a part of an area of each of said first and second connecting plates where said spring plate is not joined, or at least a part of an area facing said cavity portion.

14. The mass sensor according to claim 5, wherein the shape of said first diaphragm is different from the shape of said second diaphragm.

15. The mass sensor according to claim 6, wherein the shape of said first diaphragm is different from the shape of said second diaphragm.

16. The mass sensor according to claim 1, wherein said diaphragm, said connecting plate, said sensing plate, and said sensor substrate are integrally formed, and when said spring plate is joined to said connecting plate, said spring plate is also integrally formed.

17. The mass sensor according to claim 5, wherein said diaphragm, said connecting plate, said sensing plate, and said sensor substrate are integrally formed, and when said spring plate is joined to said connecting plate, said spring plate is also integrally formed.

18. The mass sensor according to claim 6, wherein said diaphragm, said connecting plate, said sensing plate, and said sensor substrate are integrally formed, and when said spring plate is joined to said connecting plate, said spring plate is also integrally formed.

19. The mass sensor according to claim 16, wherein said connecting plate, said diaphragm, and said sensing plate are integrally formed from a vibrating plate, said sensor substrate is integrally formed by laminating said vibrating plate and a base plate, and when said spring plate is joined to said connecting plate, said spring plate is formed from an intermediate plate, and also, said intermediate plate is inserted between said vibrating plate and said base plate, and integrally formed.

20. The mass sensor according to claim 17, wherein said connecting plate, said diaphragm, and said sensing plate are integrally formed from a vibrating plate, said sensor substrate is integrally formed by laminating said vibrating plate and a base plate, and when said spring plate is joined to said connecting plate, said spring plate is formed from an intermediate plate, and also, said intermediate plate is inserted between said vibrating plate and said base plate, and integrally formed.

21. The mass sensor according to claim 18, wherein said connecting plate, said diaphragm, and said sensing plate are integrally formed from a vibrating plate, said sensor substrate is integrally formed by laminating said vibrating plate and a base plate, and when said spring plate is joined to said connecting plate, said spring plate is formed from an intermediate plate, and also, said intermediate plate is inserted between said vibrating plate and said base plate, and integrally formed.

22. The mass sensor according to claim 1, wherein said resonating portion is formed on the inner circumferential side surface of one or more concave portion or throughholes formed in said sensor substrate.

23. The mass sensor according to claim 5, wherein said resonating portion is formed on the inner circumferential side surface of one or more concave portion or throughholes formed in said sensor substrate.

24. The mass sensor according to claim 6, wherein said resonating portion is formed on the inner circumferential side surface of one or more concave portion or throughholes formed in said sensor substrate.

25. The mass sensor according to claim 1, wherein a catching substance reacting only with a substance to be sensed and catching said substance to be sensed is applied to said diaphragm, the resonant frequencies of said resonating portion in the state where said substance to be sensed has not been caught by said catching substance and in the state after said substance to be sensed has been caught by said catching substance are measured by said piezoelectric element, and the mass of said substance to be sensed being caught is measured from change in the measured resonant frequencies.

26. The mass sensor according to claim 5, wherein a catching substance reacting only with a substance to be sensed and catching said substance to be sensed is applied to said diaphragm, the resonant frequencies of said resonating portion in the state where said substance to be sensed has not been caught by said catching substance and in the state after said substance to be sensed has been caught by said catching substance are measured by said piezoelectric element, and the mass of said substance to be sensed being caught is measured from change in the measured resonant frequencies.

27. The mass sensor according to claim 6, wherein a catching substance reacting only with a substance to be sensed and catching said substance to be sensed is applied to said diaphragm, the resonant frequencies of said resonating portion in the state where said substance to be sensed has not been caught by said catching substance and in the state after said substance to be sensed has been caught by said catching substance are measured by said piezoelectric element, and the mass of said substance to be sensed being caught is measured from change in the measured resonant frequencies.

28. The mass sensor according to claim 25, wherein when a plurality of diaphragms are used, said catching substance is not applied to at least one of said diaphragms.

29. The mass sensor according to claim 26, wherein when a plurality of diaphragms are used, said catching substance is not applied to at least one of said diaphragms.

30. The mass sensor according to claim 27, wherein when a plurality of diaphragms are used, said catching substance is not applied to at least one of said diaphragms.

31. The mass sensor according to claim 25, wherein when a plurality of diaphragms are used, different types of catching substances are applied to each of said diaphragms.

32. The mass sensor according to claim 26, wherein when a plurality of diaphragms are used, different types of catching substances are applied to each of said diaphragms.

33. The mass sensor according to claim 27, wherein when a plurality of diaphragms are used, different types of catching substances are applied to each of said diaphragms.

34. The mass sensor according to claim 1, wherein when a plurality of diaphragms are formed, the dynamic range is increased by integrating respective signals caused by change in the states of said diaphragms.

35. The mass sensor according to claim 5, wherein when a plurality of diaphragms are formed, the dynamic range is increased by integrating respective signals caused by change in the states of said diaphragms.

36. The mass sensor according to claim 6, wherein when a plurality of diaphragms are formed, the dynamic range is increased by integrating respective signals caused by change in the states of said diaphragms.

37. The mass sensor according to claim 1, wherein said piezoelectric element of said resonating portion is divided into two portions or three portions.

38. The mass sensor according to claim 5, wherein said piezoelectric element of said resonating portion is divided into two portions or three portions.

39. The mass sensor according to claim 6, wherein said piezoelectric element of said resonating portion is divided into two portions or three portions.

40. The mass sensor according to claim 37, wherein at least one piezoelectric element of said divided piezoelectric elements is used for driving, and at least one of other piezoelectric elements is used for sensing.

41. The mass sensor according to claim 38, wherein at least one piezoelectric element of said divided piezoelectric elements is used for driving, and at least one of other piezoelectric elements is used for sensing.

42. The mass sensor according to claim 39, wherein at least one piezoelectric element of said divided piezoelectric elements is used for driving, and at least one of other piezoelectric elements is used for sensing.

43. The mass sensor according to claim 1, wherein a plurality of said piezoelectric elements are arranged on said resonating portion.

44. The mass sensor according to claim 5, wherein a plurality of said piezoelectric elements are arranged on said resonating portion.

45. The mass sensor according to claim 6, wherein a plurality of said piezoelectric elements are arranged on said resonating portion.

46. The mass sensor according to claim 43, wherein at least one piezoelectric element of said plurality of piezoelectric elements is used for driving, and at least one of other piezoelectric elements is used for sensing.

47. The mass sensor according to claim 44, wherein at least one piezoelectric element of said plurality of piezoelectric elements is used for driving, and at least one of other piezoelectric elements is used for sensing.

48. The mass sensor according to claim 45, wherein at least one piezoelectric element of said plurality of piezoelectric elements is used for driving, and at least one of other piezoelectric elements is used for sensing.

49. The mass sensor according to claim 1, wherein a plurality of said resonating portions are arranged.

50. The mass sensor according to claim 5, wherein a plurality of said resonating portions are arranged.

51. The mass sensor according to claim 6, wherein a plurality of said resonating portions are arranged.

52. The mass sensor according to claim 1, wherein piezoelectric elements having directions of polarization opposite to each other are formed on the both surfaces of said sensing plate, respectively.

53. The mass sensor according to claim 5, wherein piezoelectric elements having directions of polarization opposite to each other are formed on the both surfaces of said sensing plate, respectively.

54. The mass sensor according to claim 6, wherein piezoelectric elements having directions of polarization opposite to each other are formed on the both surfaces of said sensing plate, respectively.

55. The mass sensor according to claim 1, wherein a position sensor consisting of a pair of electrodes is provided on the middle position between said diaphragm and said piezoelectric element on said sensor substrate.

56. The mass sensor according to claim 5, wherein a position sensor consisting of a pair of electrodes is provided on the middle position between said diaphragm and said piezoelectric element on said sensor substrate.

57. The mass sensor according to claim 6, wherein a position sensor consisting of a pair of electrodes is provided on the middle position between said diaphragm and said piezoelectric element on said sensor substrate.

58. The mass sensor according to claim 1, wherein piezoelectric element and electrode leads connected to said piezoelectric element are coated with a resin or glass insulation layer.

59. The mass sensor according to claim 5, wherein piezoelectric element and electrode leads connected to said piezoelectric element are coated with a resin or glass insulation layer.

60. The mass sensor according to claim 6, wherein piezoelectric element and electrode leads connected to said piezoelectric element are coated with a resin or glass insulation layer.

61. The mass sensor according to claim 58, wherein said resin is a fluorocarbon resin or a silicone resin.

62. The mass sensor according to claim 59, wherein said resin is a fluorocarbon resin or a silicone resin.

63. The mass sensor according to claim 60, wherein said resin is a fluorocarbon resin or a silicone resin.

64. The mass sensor according to claim 58, wherein a shield layer consisting of a conductive material is formed on the surface of at least a part of said insulation layer.

65. The mass sensor according to claim 59, wherein a shield layer consisting of a conductive material is formed on the surface of at least a part of said insulation layer.

66. The mass sensor according to claim 60, wherein a shield layer consisting of a conductive material is formed on the surface of at least a part of said insulation layer.

67. The mass sensor according to claim 1, wherein said sensor substrate, said diaphragm, said connecting plate, said sensing plate, and when said spring plate is provided, said spring plate are composed of fully stabilized zirconia or partially-stabilized zirconia.

68. The mass sensor according to claim 5, wherein said sensor substrate, said diaphragm, said connecting plate, said sensing plate, and when said spring plate is provided, said spring plate are composed of fully stabilized zirconia or partially-stabilized zirconia.

69. The mass sensor according to claim 6, wherein said sensor substrate, said diaphragm, said connecting plate, said sensing plate, and when said spring plate is provided, said spring plate are composed of fully stabilized zirconia or partially-stabilized zirconia.

70. The mass sensor according to claim 1, wherein the piezoelectric film in said piezoelectric element is composed of a material containing a component consisting mainly of lead zirconate, lead titanate, and lead magnesium niobate.

71. The mass sensor according to claim 5, wherein the piezoelectric film in said piezoelectric element is composed of a material containing a component consisting mainly of lead zirconate, lead titanate, and lead magnesium niobate.

72. The mass sensor according to claim 6, wherein the piezoelectric film in said piezoelectric element is composed of a material containing a component consisting mainly of lead zirconate, lead titanate, and lead magnesium niobate.

73. The mass sensor according to claim 1, wherein the shapes of at least some of said diaphragm, said connecting plate, or said sensing plate, are dimensionally adjusted by trimming with laser processing or machining.

74. The mass sensor according to claim 5, wherein the shapes of at least some of said diaphragm, said connecting plate, or said sensing plate, are dimensionally adjusted by trimming with laser processing or machining.

75. The mass sensor according to claim 6, wherein the shapes of at least some of said diaphragm, said connecting plate, or said sensing plate, are dimensionally adjusted by trimming with laser processing or machining.

76. The mass sensor according to claim 1, wherein the electrode of said piezoelectric element is trimmed with laser processing or machining for adjusting the available electrode area of said piezoelectric element.

77. The mass sensor according to claim 5, wherein the electrode of said piezoelectric element is trimmed with laser processing or machining for adjusting the available electrode area of said piezoelectric element.

78. The mass sensor according to claim 6, wherein the electrode of said piezoelectric element is trimmed with laser processing or machining for adjusting the available electrode area of said piezoelectric element.

79. A method for sensing the mass comprising:
providing a mass sensor comprising a diaphragm, a sensing plate having a piezoelectric element arranged on at least a part of at least one surface joining respective sides, a connecting plate sandwiched by the diaphragm and the sensing plate, wherein the diaphragm, the sensing plate, the piezoelectric element and the connecting plate form a resonating portion, and
measuring resonant frequencies by said piezoelectric element, on the basis of an oscillation mode in which said diaphragm performs reciprocal oscillation in parallel to the direction of said connecting plate sandwiched by said sensing plate and said diaphragm.

* * * * *